(12) United States Patent
Miyasaka et al.

(10) Patent No.: US 6,483,549 B2
(45) Date of Patent: Nov. 19, 2002

(54) VIDEO SIGNAL RECEIVER WITH LEVEL LIMITED OUTPUT

(75) Inventors: Hideki Miyasaka, Kawasaki (JP); Hiroshi Ohtsuru, Kawasaki (JP); Tetsuya Yasui, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/040,199

(22) Filed: Oct. 23, 2001

(65) Prior Publication Data

US 2002/0057376 A1 May 16, 2002

Related U.S. Application Data

(62) Division of application No. 09/183,372, filed on Oct. 30, 1998, now Pat. No. 6,317,163.

(30) Foreign Application Priority Data

Feb. 16, 1998 (JP) ............................................. 10-032956

(51) Int. Cl.[7] .............................................. H04N 5/14
(52) U.S. Cl. ........................ 348/571; 348/689; 348/690
(58) Field of Search ................................. 348/690, 571, 348/572, 689; H04N 5/14

(56) References Cited

U.S. PATENT DOCUMENTS

| 4,884,128 A | 11/1989 | Hedia |
| 5,097,322 A | 3/1992 | Fairhurst |
| 5,099,330 A | 3/1992 | Fuse et al. |
| 5,734,438 A | 3/1998 | Into |
| 5,831,683 A | 11/1998 | Matsumoto et al. |

FOREIGN PATENT DOCUMENTS

| JP | 52-151513 | 12/1977 |
| JP | 58-99076 | 6/1983 |
| JP | 61-90281 | 5/1986 |
| JP | 5-252434 | 9/1993 |

*Primary Examiner*—Sherrie Hsia
(74) *Attorney, Agent, or Firm*—Katten Muchin Zavis Rosenman

(57) ABSTRACT

A video signal processing apparatus includes a receiver receiving an incoming video signal and producing an output video signal in response thereto, a limit setup unit setting up at least one of an upper limit value and a lower limit value for the output video signal, and a limiter supplied with the output video signal from the receiver and further with at least one of the upper limit value and the lower limit value from the limit setup unit, wherein the limiter limits a level of the output video signal produced by the receiver, by comparing the level of the output video signal according to any of the upper limit value and the lower limit value.

2 Claims, 25 Drawing Sheets

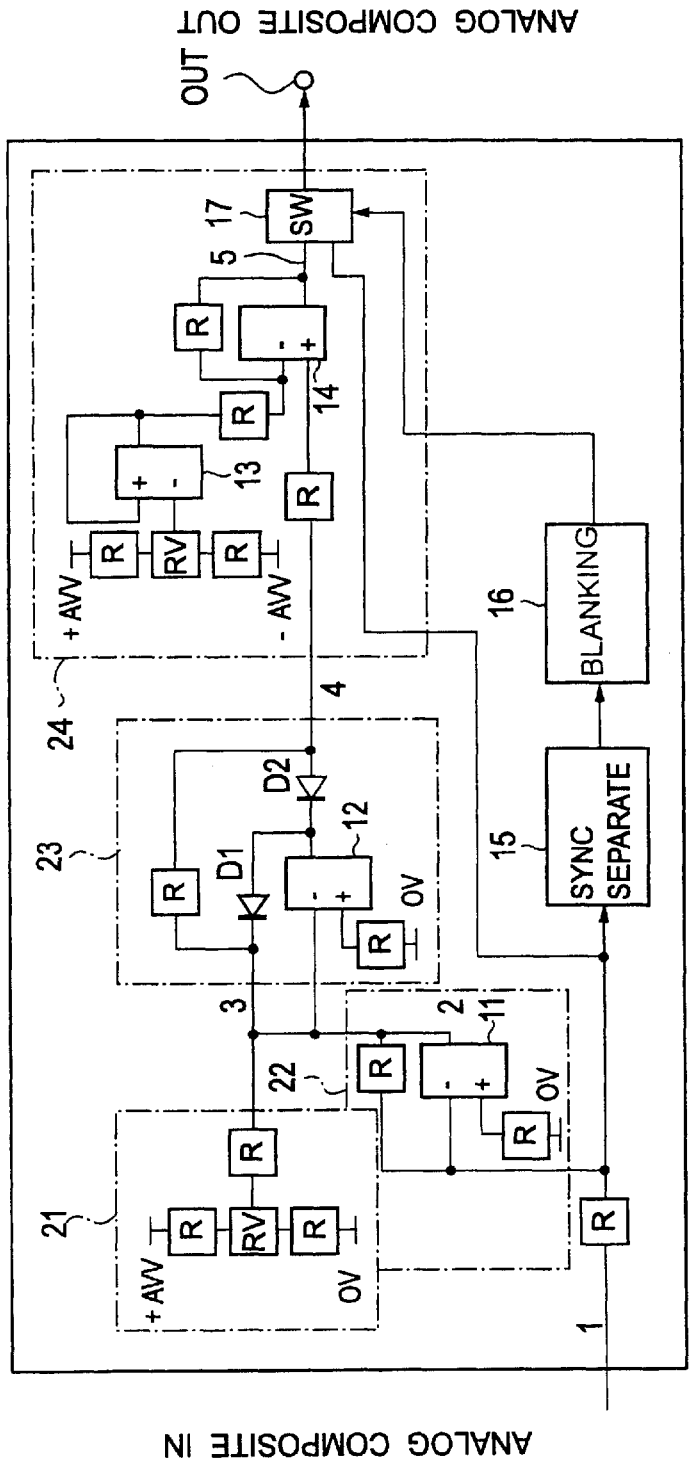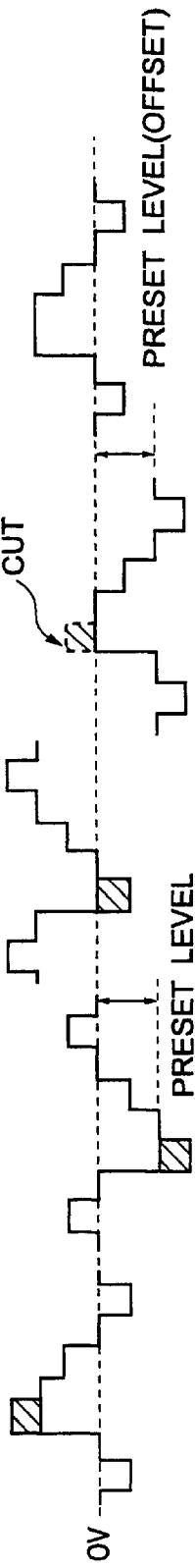

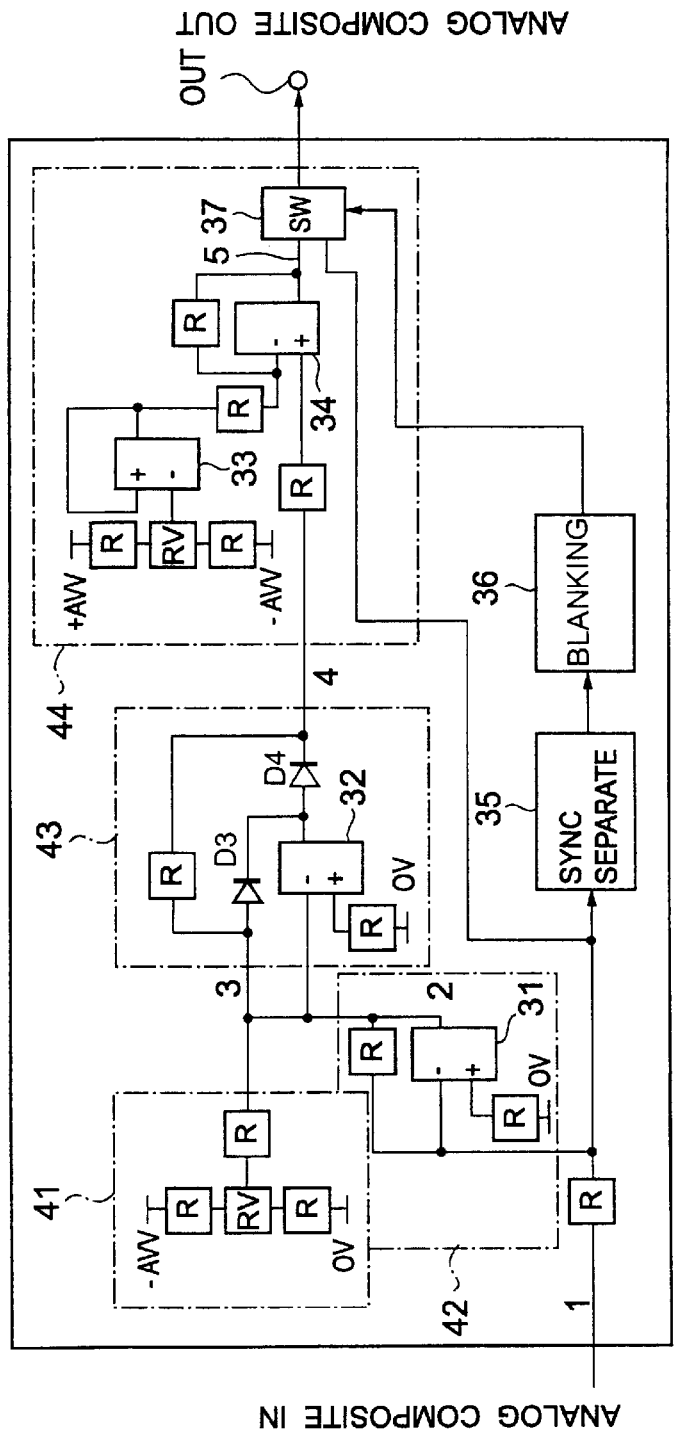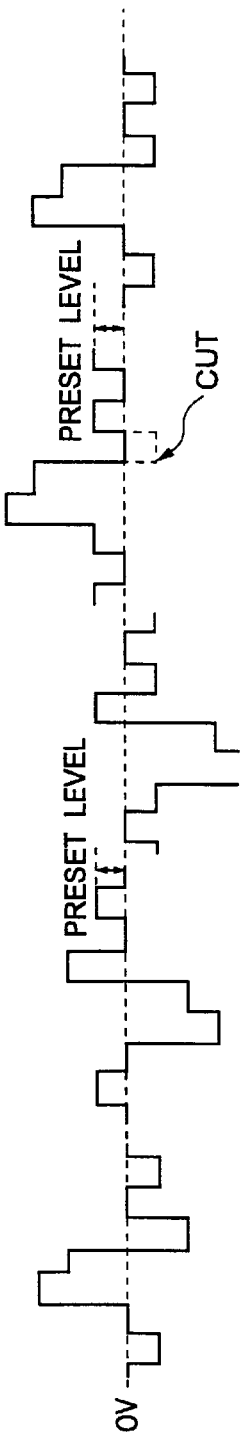

FIG.21

VIDEO SIGNAL RECEIVER WITH LEVEL LIMITED OUTPUT

CROSS REFERENCES TO RELATED APPLICATIONS

This is a division of U.S. application Ser. No. 09/183,372, filed Oct. 30, 1998, U.S. Pat. No. 6,317,163.

BACKGROUND OF THE INVENTION

The present invention relates to a video signal processing apparatus that limits the level of a received video signal when the level of the received video signal has exceeded a predetermined level by a noise or interference.

When a video signal is transmitted from an imaging apparatus or an image reproducing apparatus to a receiver for image reproduction, the video signal is generally transmitted in the form of an analog video signal or a digital video signal. During such a transmission of the video signal, there can be a case in which the level of the video signal exceeds a predetermined level for reception as a result of mixing of noise or interference with other signals including other video signals. When the level of the received video signal exceeds the predetermined level as such, there can be a case in which a pseudo-synchronization is caused. Alternatively, the excessive level of the video signal may cause a deterioration in the quality of reproduced image. Thus, there is a need to limit the level of a received video signal within a predetermined level.

FIG. 1A shows a conventional image signal transmission system implemented in the form of a coded image transmission system, wherein the video signal transmission system includes an analog video signal output unit 301, which may be an imaging device or a video signal recording/reproducing apparatus, an encoding and transmission unit 302 for encoding and transmitting the analog video signal from the unit 301 over a transmission path 305, a video signal processing unit 303 receiving the encoded video signal from the unit 302 through the transmission path 305, a video signal processing unit 303 decoding the encoded video signal thus received and converting the same into an analog video signal, and a reproducing unit 304 for reproducing the analog video signal thus recovered by the video signal processing unit 303. As can be seen in FIG. 1A, the encoding and transmission unit 302 includes an A-D converter 306 for converting the input analog video signal to a digital video signal, an encoder 307 for encoding the digital video signal produced by the A-D converter 306 and an interface device 308 for transmitting the encoded video signal over the transmission path 305. Further, the video signal processing unit 303 includes an interface unit 309 for receiving the encoded video signal from the transmission path 305, a decoder 310 for decoding the encoded video signal thus received by the interface unit 309, and a D-A converter 311 for converting the decoded video signal to an analog video signal.

FIG. 1B shows another conventional image signal transmission system implemented in the form of a digital image transmission system, wherein the video signal transmission system includes an analog video signal output unit 321, which may be an imaging device or a video signal recording/reproducing apparatus, a digital transmission unit 322 for converting the analog video signal from the unit 321 into a digital video signal and transmitting the same over a transmission path 325, a video signal processing unit 323 receiving the digital video signal from the digital transmission unit 322 through the transmission path 305, a video signal processing unit 323 converting the received digital video signal into an analog video signal, and a reproducing unit 324 for reproducing the analog video signal thus recovered by the video signal processing unit 323. As can be seen in FIG. 1B, the transmission unit 322 includes an A-D converter 326 for converting the input analog video signal to the digital video signal and an interface device 327 for transmitting the digital video signal over the transmission path 325. Further, the video signal processing unit 323 includes an interface unit 328 for receiving the digital video signal from the transmission path 325 and a D-A converter 329 for converting the digital video signal to an analog video signal.

FIG. 1C shows another conventional image signal transmission system implemented in the form of an analog image transmission system, wherein the video signal transmission system includes an analog video signal output unit 331, which may be an imaging device or a video signal recording/reproducing apparatus, an analog transmission unit 332 for transmitting the analog video signal from the unit 331 over a transmission path 335, a video signal processing unit 333 receiving the analog video signal from the analog transmission unit 332 through the transmission path 335, the video signal processing unit 333 receiving the an analog video signal from the transmission unit 332 via the transmission path 335, and a reproducing unit 334 for reproducing the analog video signal thus received by the video signal processing unit 333. As can be seen in FIG. 1C, the transmission unit 332 includes an A-D converter 336 for converting the input analog video signal to the digital video signal, while the video signal processing unit 333 includes an interface unit 337 for receiving the analog video signal from the transmission path 335.

FIG. 2A shows a 100% color bar signal that includes a synchronization pulse of −40 (IRE) level and a video signal, wherein the video signal has a level not lower than the level of the synchronization signal. The maximum level of the video signal is set to 133 (IRE) level.

When the video signal has a level lower than the −40 (IRE) level as indicated in FIG. 2B, it will be noted that the portion of the video signal having such a low level state is erroneously recognized as being a synchronization pulse, and there arises a problem of erroneous pseudo-synchronization. When the video signal includes a portion having a level exceeding 133 (IRE), on the other hand, the quality of the reproduced image is deteriorated as a result of saturation.

In the encoded video signal transmission system of FIG. 1A, it should be noted that the A-D converter 306 and the D-A converter 311 create error in the video signal associated with analog-to-digital conversion or digital-to-analog conversion of the video signal. Further, the encoder 307 and the decoder 310 create error as a result of the encoding or decoding of the video signal. Further, the transmission path 325 may pickup noise.

In the digital video signal transmission system of FIG. 1B, the A-D converter 326 and the D-A converter 329 create error in the video signal associated with the analog-to-digital conversion or digital-to-analog conversion of the video signal. Further, the transmission path 305 may pickup noise. In the analog video signal transmission system of FIG. 1C, on the other hand, the transmission path 335 may pickup noise.

As a result of the mixing of noise or conversion error, or as a result of the interference of the signals transmitted in a multiplexed mode, there can be a case in which the video signal supplied from the video signal processing unit 303, 323 or 333 to the reproducing unit 304, 324 or 334 contains an under-level portion or over-level portion as indicated in FIG. 2B. When this is the case, the under-level portion of the video signal may be erroneously recognized as being a synchronization pulse, and there occurs a problem of pseudo-synchronization. When the video signal contains an over-level portion, on the other hand, the quality of the reproduced image may be deteriorated.

SUMMARY OF THE INVENTION

Accordingly, it is a general object of the present invention to provide a novel and useful video signal processing apparatus wherein the foregoing problems are eliminated.

Another and more specific object of the present invention is to provide a video signal processing apparatus producing an output video signal in response to a received video signal, which may be any of an encoded image signal, a digital image signal or an analog image signal, such that the level of the output video signal does not fall below a predetermined lower limit level or does not exceed a predetermined upper limit level.

Another object of the present invention is to provide a video signal processing apparatus, comprising:

a receiver receiving an incoming video signal, said receiver further producing an output video signal in response thereto;

a limiter setup unit setting up at least one of an upper limit value and a lower limit value for said output video signal; and a limiter supplied with said output video signal from said receiver and further supplied with at least one of said upper limit value and said lower limit value from said limiter setup unit, said limiter limiting a level of said output video signal produced by said receiver, by comparing said level of said output video signal with any of said upper limit value and lower limit value.

According to the present invention, the level of the output video signal is held within a predetermined limit even in the case in which the received video signal has been subjected to various distortions as a result of transmission noise or interference, or as a result of error at the time of digitization or encoding/decoding process. Thereby, the problem of pseudo-synchronization caused by the under-level portion of the video signal or the problem of deterioration of picture quality caused by the over-level portion of the video signal, is successfully eliminated.

By conducting the limiting process such that the sum of a luminance signal Y and a color signal C does not exceed a predetermined upper limit value or lower limit value, the effect of the distortion on the reproduced picture quality is effectively suppressed.

The construction of the present invention is easy for implementation when realized by using a processor such as DSP (digital signal processor). In this case, the desired limiting function can be realized simultaneously with other signal processing functions. When the present invention is realized in the form of hardware, on the other hand, a high-speed processing is obtained.

Other objects and further features of the present invention will become apparent from the following detailed description when read in conjunction with the attached drawings.

BRIEF DESCRIPTION OF THE DRAWINGS

FIGS. 4A–4F are diagrams showing the construction of a video signal processing apparatus according to a first embodiment of the present invention;

FIGS. 5A–5F are diagrams showing the construction of a video signal processing apparatus according to a second embodiment of the present invention;

FIG. 21 is a diagram showing the construction of a processing unit conducting an operation;

DETAILED DESCRIPTION OF THE PREFERRED EMBODIMENTS

[Principle]

Figure 3A:
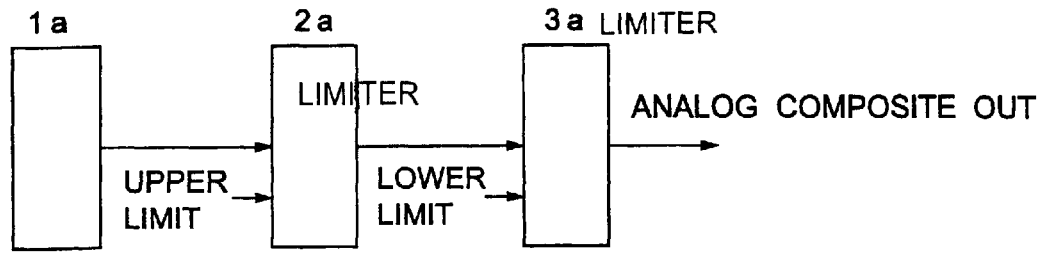
FIGS. 3A–3C are diagrams showing the principle of the present invention.
Figure 3B:
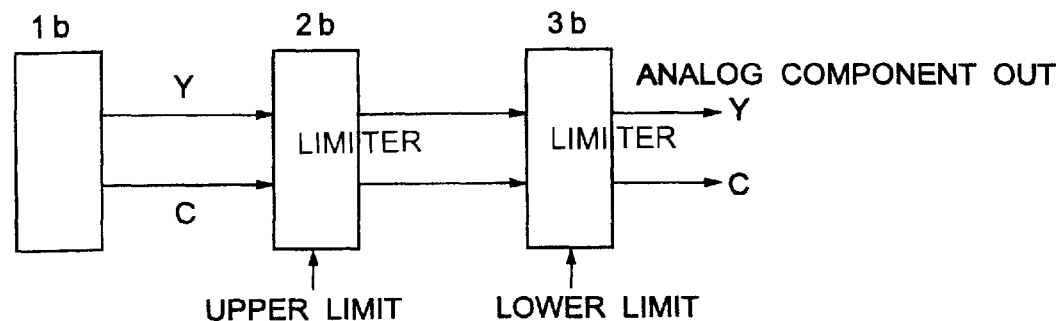
Figure 3C:
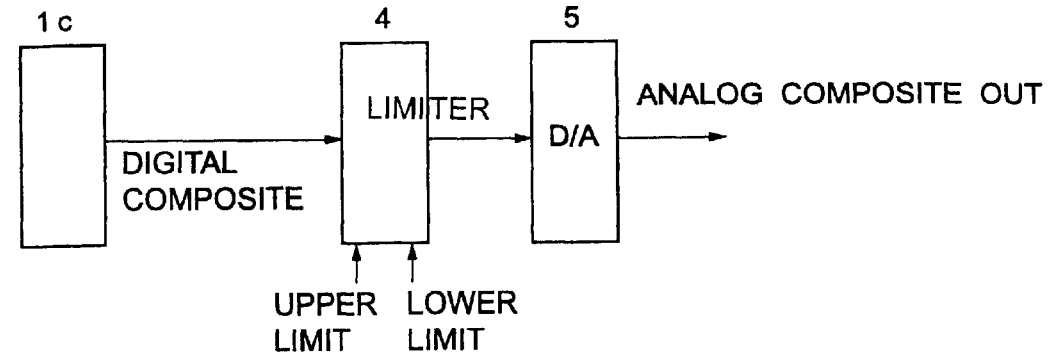

FIGS. 3A–3C show the principle of the present invention, wherein FIG. 3A shows the case of receiving a digital composite signal and producing an analog composite signal.

Referring to FIG. 3A, a receiver 1a receives the digital composite signal and produces an analog composite signal in response thereto, wherein the analog composite signal thus produced by the receiver 1a is processed by an upper limiter 2a and a lower limiter 2b consecutively. Thereby, the upper limiter 2a and the lower limiter 2b have respective upper and lower limit levels based on the reference level of the 100% color bar signal or the 75% color bar signal, and limits the over-level portion or under-level portion of the analog composite signal produced by the receiver 1a.

Referring to FIG. 3B, on the other hand, a receiver 1b receives an analog video signal containing therein a luminance signal Y and a color signal C as analog component signals, and separates the analog component signals Y and C from each other. The analog component signals Y and C thus separated are then passed through an upper limiter 2b and a lower limiter 2c consecutively, wherein the upper limiter 2b limits the over-level portion of the signals Y and C while the lower limiter 3b limits the under-level portion of the signals Y and C. Thereby, the upper and lower limiters 2b and 3b limit the level of the color signal C in such a manner the sum of the luminance signal Y and the color signal C does not exceed a predetermined upper limit or lower limit.

FIG. 3C shows a construction in which a receiver 1c receives an incoming digital composite signal and produces an output digital composite signal in response thereto, wherein the upper and lower levels of the output digital composite signal are limited by a limiter 4 according to respective upper and lower limit levels, and the output digital composite signal thus processed by the limiter 4 is converted to an analog composite signal by a D-A converter 5.

In the constructions of FIGS. 3A–3C, it is also possible to omit the upper limiter or the lower limiter. Such a modification can be made as needed according to the transmission characteristics of the video signals. In the case of the construction of FIG. 3C that produces a digital composite signal, which contains a luminance signal Y and color difference signals Cb and Cr, the limiter 4 limits the level of a color difference signal Cb and a color difference signal Cr such that the sum of the luminance signal Y and the color difference signals Cb and Cr does not exceed a predetermined upper limit level or a lower limit level.

[First Embodiment]

FIG. 4 shows the construction of an upper limit circuit used in a video signal processing apparatus according to a first embodiment of the present invention.

Referring to FIG. 4, the upper limit circuit of the video signal processing apparatus includes a synchronization separation circuit 15, a blanking circuit 16, a switch circuit (SW) 17, a level setup circuit 21, an inversion circuit 22, an ideal diode circuit 23, and an offset adjustment circuit 24, wherein it can be seen that the ideal diode circuit 23 includes therein diodes D1 and D2, while the offset adjustment circuit 24 includes a resistance R and a variable resistance RV. A similar resistance R and a variable resistance RV are used also in the level setup circuit 21.

Figure 1A:
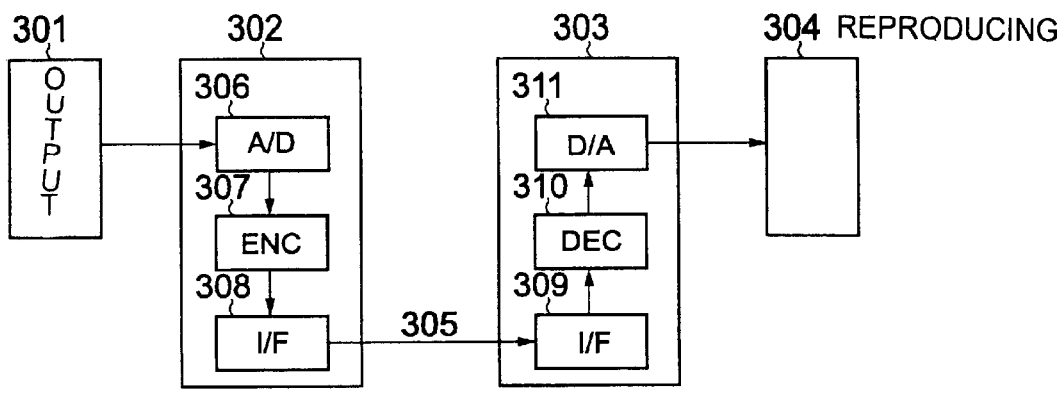
FIGS. 1A–1C are diagrams showing the construction of a video signal transmission system.
Figure 1B:
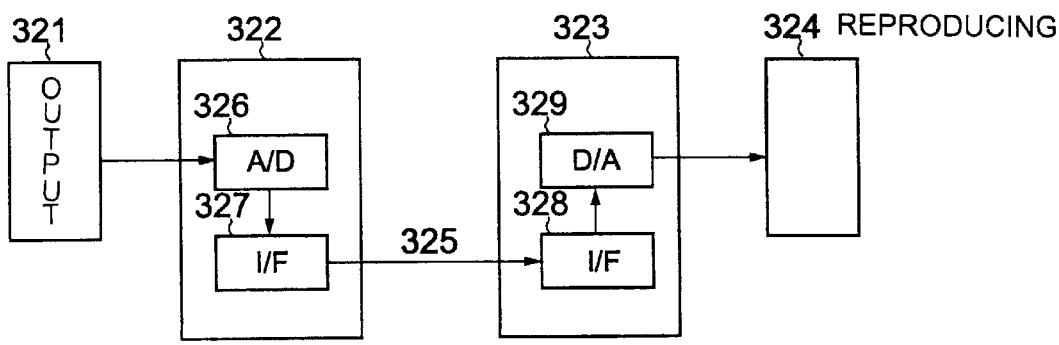
Figure 1C:
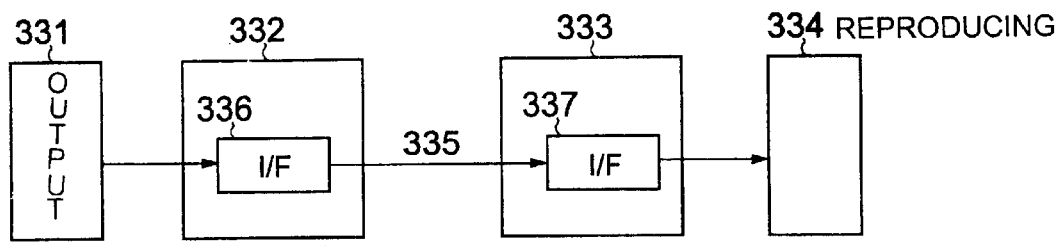
Figure 2A:
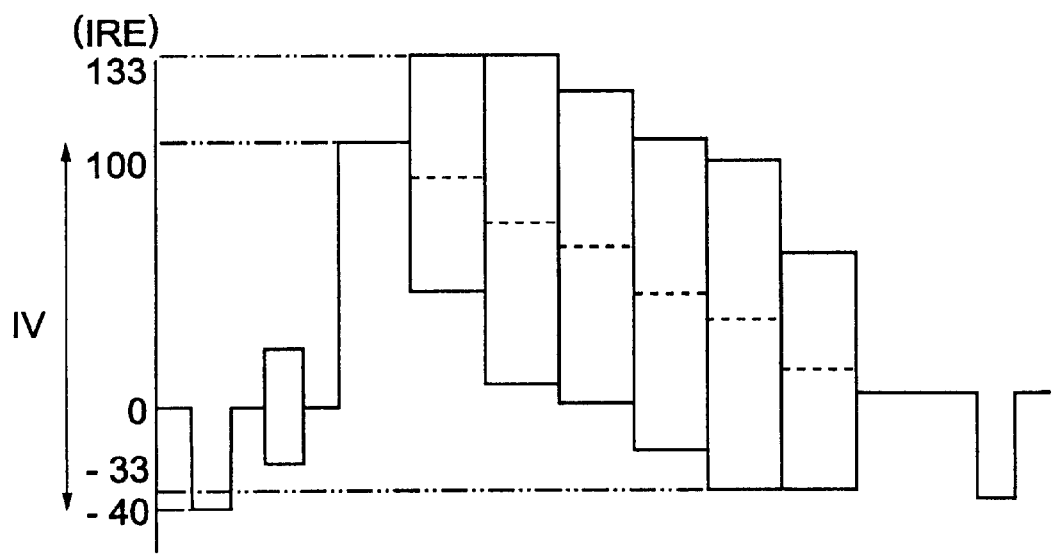
FIGS. 2A and 2B are diagrams showing a color bar signal.
Figure 2B:
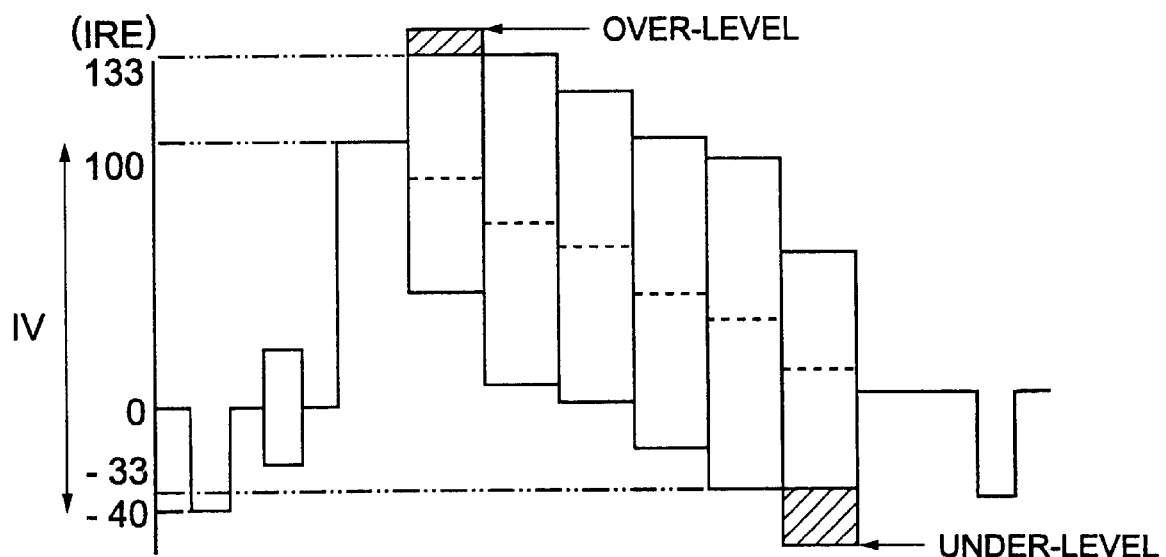

In more detail, the level setup circuit 21 includes a voltage divider formed by the resistance R and the variable resistance RV and sets up the upper limit value based on a positive voltage +AVV. For example, this upper limit value may be set to 133 (IRE), as indicated in FIG. 2A. The inversion circuit 22, on the other hand, includes an operational amplifier 11, wherein the operational amplifier 11 inverts the analog composite signal supplied to an inverting input terminal thereof. The analog composite signal thus inverted is supplied to the ideal diode circuit 23 as an output signal of the inversion circuit.

The ideal diode circuit 23 includes an operational amplifier 12 in addition to the diodes D1 and D2 and performs an ideal half-wave rectification in which the forward voltage-drop occurring across the diodes D1 or D2 is successfully compensated. The ideal diode circuit 23 carries out the ideal half-wave rectification on the positive portion of the analog composite video signal supplied thereto from the inversion circuit with a positive voltage offset caused by the level setup circuit 21 and produces an output video signal after polarity inversion. The output composite video signal thus obtained by the ideal diode circuit 23 is then supplied to a non-inverting input terminal of an operational amplifier 14 in the offset adjustment circuit 24, wherein the operational amplifier 14 is further supplied, at an inverting input terminal thereof, with an offset voltage produced by a voltage divider, which is formed in the circuit 23 by the resistance R and the variable resistance RV, via an operational amplifier 13, and the composite video signal thus obtained is forwarded to an output terminal via the switch circuit 17.

It should be noted that the switch circuit 17 is controlled by the blanking circuit 16 in response to a synchronization signal, which is separated from the incoming composite video signal by the synchronization separation circuit 15, wherein the switch circuit 17 causes the portion of the incoming video signal containing the synchronization signal to pass therethrough in response to the control of the blanking circuit 16. On the other hand, the remaining portion of the incoming video signal is forwarded to the output terminal via the switch circuit 17 after being processed by the circuits 21–24.

In the case of the incoming composite video signal contained an over-level portion as indicated in FIG. 4B, the signal of FIG. 4B is inverted in polarity in the inversion circuit 22 as indicated in FIG. 4C, and the signal of FIG. 4C is supplied to the ideal diode circuit 23 with the positive voltage offset as indicated in FIG. 4D. As a result of the half-wave rectification of the ideal diode circuit 23, it will be noted that the over-level portion in the incoming composite video signal of FIG. 4D is removed as indicated in FIG. 4E, and the output analog composite video signal is obtained as indicated in FIG. 4F after polarity inversion and level adjustment conducted in the circuit 24.

[Third Embodiment]

FIG. 5 shows the construction of a lower limit circuit used in a video signal processing apparatus according to a second embodiment of the present invention.

Referring to FIG. 5, the lower limit circuit of the video signal processing apparatus includes a synchronization separation circuit 35, a blanking circuit 36, a switch circuit (SW) 37, a level setup circuit 31, an inversion circuit 42, an ideal diode circuit 43, and an offset adjustment circuit 44, wherein it can be seen that the ideal diode circuit 43 includes therein diodes D3 and D4, while the offset adjustment circuit 44 includes a resistance R and a variable resistance RV. A similar resistance R and a variable resistance RV are used also in the level setup circuit 21.

In more detail, the level setup circuit 41 includes a voltage divider formed by the resistance R and the variable resistance RV and sets up the lower limit value based on a negative voltage −AVV. For example, this upper limit value may be set to −40 (IRE), as indicated in FIG. 2A. The inversion circuit 22, on the other hand, includes an operational amplifier 31, wherein the operational amplifier 31 inverts the analog composite signal supplied to a non-inverting input terminal thereof. The analog composite signal thus inverted is supplied to the ideal diode circuit 43 as an output signal of the inversion circuit.

The ideal diode circuit 43 includes an operational amplifier 32 in addition to the diodes D3 and D4 and performs an ideal half-wave rectification for the negative portion of the composite video signal in such a manner that the forward voltage-drop occurring across the diodes D3 or D4 is successfully compensated. It should be noted that the diodes D3 and D4 are provided with a reversed direction as compared with the diodes D1 and D2. The ideal diode circuit 43 carries out the ideal half-wave rectification on the analog composite video signal supplied thereto from the inversion circuit with a negative voltage offset caused by the level setup circuit 41 and produces an output video signal after polarity inversion. The output composite video signal thus obtained by the ideal diode circuit 43 is then supplied to a non-inverting input terminal of an operational amplifier 34 in the offset adjustment circuit 44, wherein the is operational amplifier 34 is further supplied, at an inverting input terminal thereof, with an offset voltage produced by a voltage divider, which is formed in the circuit 44 by the resistance R and the variable resistance RV, via an operational amplifier 33, and the composite video signal thus obtained is forwarded to an output terminal via the switch circuit 37.

It should be noted that the switch circuit 37 is controlled by the blanking circuit 36 in response to a synchronization signal, which is separated from the incoming composite video signal by the synchronization separation circuit 35, wherein the switch circuit 37 causes the portion of the incoming video signal containing the synchronization signal to pass therethrough in response to the control of the blanking circuit 36. On the other hand, the remaining portion of the incoming video signal is forwarded to the output terminal via the switch circuit 37 after being processed by the circuits 41–44.

In the case of the incoming composite video signal contained an over-level portion as indicated in FIG. 5B, the signal of FIG. 5B is inverted in polarity in the inversion circuit 42 as indicated in FIG. 5C, and the signal of FIG. 5C is supplied to the ideal diode circuit 43 with the positive voltage offset as indicated in FIG. 5D. As a result of the half-wave rectification of the ideal diode circuit 43, it will be noted that the over-level portion in the incoming composite video signal of FIG. 5D is removed as indicated in FIG. 5E, and the output analog composite video signal is obtained as indicated in FIG. 5F after polarity inversion and level adjustment conducted in the circuit 34.

Thus, by connecting the circuit of FIG. 4A and the circuit of FIG. 5A in series as indicated in FIG. 3A respectively as the upper limit circuit and the lower limit circuit, it becomes possible to cut both the over-level portion and the under-level portion of the incoming analog composite video signal. It is of course possible to connect the circuit of FIG. 4A behind the circuit of FIG. 5A without problem.

[Third Embodiment]

Figure 6:
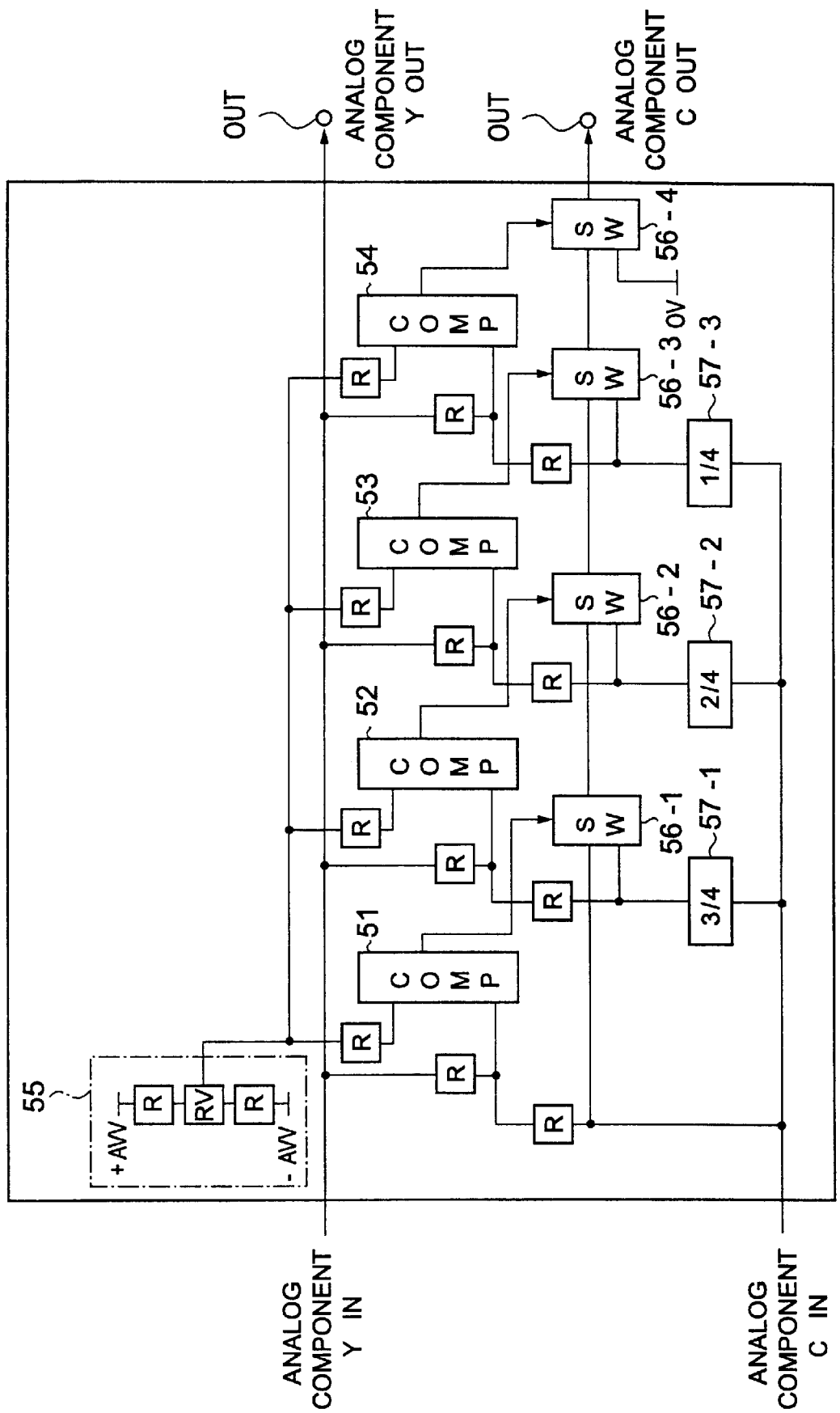
FIG. 6 is a diagram showing the construction of a video signal processing apparatus according to a third embodiment of the present invention.

FIG. 6 shows the construction of an upper limit circuit used in a video signal processing apparatus according to a third embodiment of the present invention.

Referring to FIG. 6, the video signal processing apparatus receives an analog component signal Y (luminance signal) and an analog component signal C (color signal) and the upper limit circuit of the video signal processing apparatus includes comparators 51–54, a level adjustment circuit 55, switch circuits $56_1$–$56_4$, and voltage dividers $57_1$–$57_3$, wherein the level adjustment circuit 55 includes a resistance R and a variable resistance RV forming a voltage divider between a positive voltage +AVV and a negative voltage –AVV.

In such a video signal processing system in which both the analog component signal Y and the analog component signal C are supplied, it should be noted that there is a substantial risk that the analog component signal C causes the problem of over-level in the video signal. Thus, the limiter of the present embodiment is designed to limit the amplitude of the analog component signal C, while the limiter allows the analog component signal Y to pass therethrough as it is.

In order to achieve such an operation, the limiter of FIG. 6 divides the incoming analog component signal C by the voltage divider $57_1$, $57_2$ and $57_3$ respectively to 1/3, 2/4 and 1/4 the level of the incoming analog component signal C, and the analog component signal C, of which level is thus divided, is added to the incoming analog component signal Y to form a sum signal. The sum signals thus formed are then supplied to the comparators 51–51 respectively, wherein each of the comparators 51–54 compares the level of the sum signal supplied thereto with a preset upper level supplied from the level adjustment circuit 55.

Thus, when the sum of the incoming analog component signal C and the incoming analog component signal Y, supplied to the comparator 51 via respective resistances R, has exceeded the predetermined preset level, the comparator 51 produces an output signal that controls the switch circuit 56, such that the 3/4-divided signal of the component signal C is supplied from the voltage divider $57_1$ to the next stage switch circuit $56_2$ in the direction of an output terminal. When the level of the sum signal does not exceed the foregoing predetermined preset level, on the other hand, the switch circuit $56_1$ forwards the incoming signal component C selectively to the next stage switch circuit $56_2$. In the case the level of the 3/4-divided signal of the signal component C in the voltage divider $57_1$ exceeds the preset level when added with the incoming component signal Y, on the other hand, the comparator 52 produces an output signal that controls the switch circuit $56_2$ such that the 2/4-divided signal component C of the voltage divider $57_2$ is supplied to the next stage switch circuit $56_3$. When this is not the case, the switch circuit $56_2$ selects the output signal of the switch circuit $56_1$, which signal is either the input analog component signal C itself or the 3/4-divided signal of the signal C, and supplies the same to the next stage switch circuit $56_3$.

Similarly, in the case the level of the 2/4-divided signal of the signal component C in the voltage divider $57_2$ exceeds the preset level when added with the incoming component signal Y, the comparator 53 produces an output signal that controls the switch circuit 563 such that the 1/4-divided signal of the signal component C of the voltage divider $57_3$ is supplied to the next stage switch circuit $56_4$. When this is not the case, the switch circuit $56_3$ selects the output signal of the switch circuit $56_2$, which is either the input analog component signal C, the 3/4-divided signal of the signal C or the 2/4-divided signal of the component signal C, and supplies the same to the next stage switch circuit $56_4$.

Further, in the case the level of the 1/4-divided signal of the signal component C in the voltage divider $57_3$ exceeds the preset level when added with the incoming component signal Y, the comparator 54 produces an output signal that controls the switch circuit 564 such that a 0 V signal is supplied to the output terminal. When this is not the case, the switch circuit $56_4$ selects the output signal of the switch circuit $56_3$, which is either the input analog component signal C itself, the 3/4-divided signal of the signal C, the 2/4-divided signal of the component signal C, or the 1/4-divided signal of the component signal C, and supplies the same to the output terminal.

Of course, the number of the stages in the limiter circuit is not limited to four but may be five or more. By increasing the number of the stages in the limiter circuit, the accuracy of limiting operation of the limiter circuit is improved. Further, the ratio of the voltage-dividing in the stages may be changed from one stage to the next stage according to a predetermined function.

[Fourth Embodiment]

Figure 7:
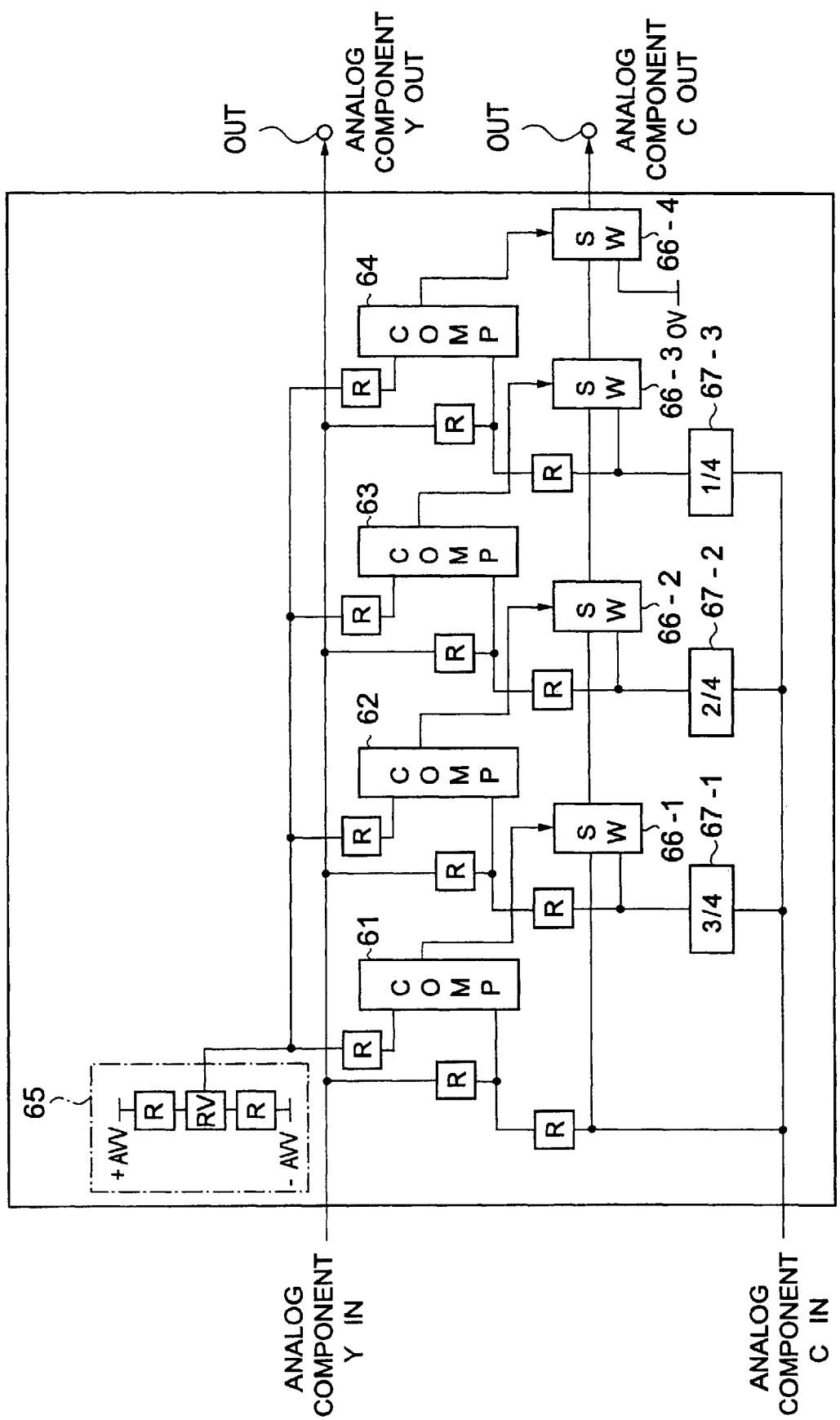
FIG. 7 is a diagram showing the construction of a video signal processing apparatus according to a fourth embodiment of the present invention.

FIG. 7 shows the construction of a lower limit circuit used in a video signal processing apparatus according to a third embodiment of the present invention.

Referring to FIG. 7, the video signal processing apparatus receives an analog component signal Y (luminance signal) and an analog component signal C (color signal) and the lower limit circuit of the video signal processing apparatus includes comparators 61–64, a level adjustment circuit 65, switch circuits $66_1$–$66_4$, and voltage dividers $67_1$–$67_3$, wherein the level adjustment circuit 65 includes a resistance R and a variable resistance RV forming a voltage divider between a positive voltage +AVV and a negative voltage –AVV. The level adjustment circuit 65 may produce a voltage level of –40 (IRE) corresponding to the synchronization pulse level of FIG. 2A.

In the limiter of FIG. 7, the incoming analog component signal C and the analog component signal Y are added each other after passing through the respective resistances R to form a sum signal, and the sum signal thus produced is supplied to the comparator 61 for comparison with the predetermined level supplied from the level adjustment circuit 65. Further, the incoming analog component signal C is divided by the voltage divider $57_1$, $57_2$ and $57_3$ to respectively 1/3, 2/4 and 1/4 the level of the incoming analog component signal C, and the analog component signal C, of which level is thus divided, is added to the incoming analog component signal Y to form the sum signal. The sum signals thus formed are then supplied to the comparators 61–64 respectively, wherein each of the comparators 61–64 compares the level of the sum signal supplied thereto with the preset lower level supplied from the level adjustment circuit 65.

Thus, when the sum of the incoming analog component signal C and the incoming analog component signal Y, supplied to the comparator 61 via respective resistances R, has exceeded the predetermined preset level in the lower direction or negative voltage direction, the comparator 61 produces an output signal that controls the switch circuit $66_1$ such that the 3/4-divided signal of the component signal C is supplied from the voltage divider $67_1$ to the next stage switch circuit $66_2$ in the direction of an output terminal. When the level of the sum signal does not exceed the foregoing predetermined preset level, on the other hand, the switch circuit $66_1$ forwards the incoming signal component C selectively to the next stage switch circuit $66_2$ in the direction of the output terminal. In the case the level of the 3/4-divided signal of the signal component C in the voltage divider $57_1$ exceeds the preset level in the negative voltage direction when added with the incoming component signal Y, on the other hand, the comparator 62 produces an output signal that controls the switch circuit $66_2$ such that the 2/4-divided signal component C of the voltage divider $67_2$ is supplied to the next stage switch circuit $66_3$ in the direction of the output terminal. When this is not the case, the switch circuit $66_2$ selects the output signal of the switch circuit $66_1$, which signal is either the input analog component signal C itself or the 3/4-divided signal of the signal C, and supplies the same to the next stage switch circuit $66_3$.

Similarly, in the case the level of the 2/4-divided signal of the signal component C in the voltage divider $67_2$ exceeds the preset level in the negative voltage direction when added with the incoming component signal Y, the comparator 63 produces an output signal that controls the switch circuit $66_3$ such that the 1/4-divided signal of the signal component C of the voltage divider $67_3$ is supplied to the next stage switch circuit $66_4$. When this is not the case, the switch circuit $66_3$ selects the output signal of the switch circuit $66_2$, which is either the input analog component signal C, the 3/4-divided signal of the signal C or the 2/4-divided signal of the component signal C, and supplies the same to the next stage switch circuit $66_4$.

Further, in the case the level of the 1/4-divided signal of the signal component C in the voltage divider $57_3$ exceeds the preset level in the negative voltage direction when added with the incoming component signal Y, the comparator 64 produces an output signal that controls the switch circuit $66_4$ such that a 0 V signal is supplied to the output terminal. When this is not the case, the switch circuit $66_4$ selects the output signal of the switch circuit $66_3$, which is either the input analog component signal C itself, the 3/4-divided signal of the signal C, the 2/4-divided signal of the component signal C, or the 1/4-divided signal of the component signal C, and supplies the same to the output terminal.

Thus, by connecting the upper limit circuit of FIG. 6 and the lower limit circuit of FIG. 7 in series as indicated in FIG. 3B, it becomes possible to cut both the over-level portion and the under-level portion of the incoming analog composite video signal. It is of course possible to connect the circuit of FIG. 6 behind the circuit of FIG. 7 without problem.

[Fifth Embodiment]

Figure 8:
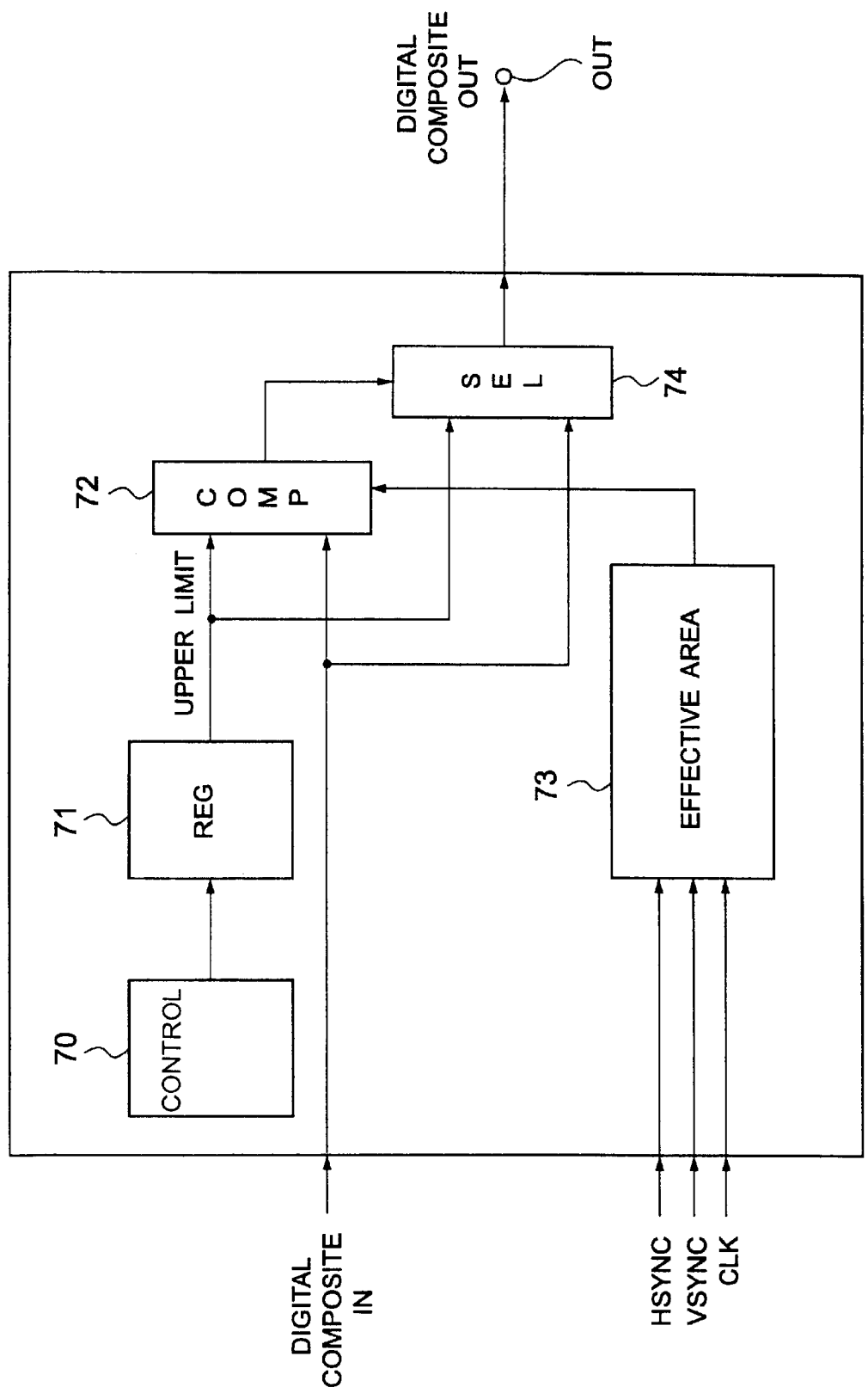
FIG. 8 is a diagram showing the construction of a video signal processing apparatus according to a fifth embodiment of the present invention.

FIG. 8 shows the construction of an upper limit circuit used in a video signal processing apparatus according to a fifth embodiment of the present invention, wherein the upper limit circuit generally includes a control unit 70 including therein a processor, a register 71 setting up an upper limit value under control of the control unit 70, a comparator (COMP) 72, an effective area indicator 73, and a selector (SE) 74.

Referring to FIG. 8, the upper limit circuit is supplied with a digital composite signal, a horizontal synchronization signal HSYNC, a vertical synchronization signal VSYNC and a sampling clock signal CLK, wherein the digital composite signal is received by the comparator 72 and the comparator 72 compares the digital composite signal with the upper limit value supplied from the register 71. In an example, both the digital composite signal and the upper limit value in the register 71 are represented by an 8-bit data format. Further, the effective area indicator 73 is supplied with the horizontal synchronization signal HSYNC, the vertical synchronization signal VSYNC and the clock signal CLK and defines an effective area in which the horizontal blanking interval and the vertical blanking interval are excluded. Thereby, the effective area indicator 73 controls the comparator 72 and the comparator 72 carries out the foregoing comparison in the effective area thus defined.

When the value of the incoming digital composite signal exceeds the foregoing upper limit value, the comparator 72 controls the selector 74 such that the selector 74 produces an output signal fixed to the foregoing upper limit value at an output terminal. When the value of the incoming digital composite signal does not exceed the foregoing upper limit value, on the other hand, the selector 74 forwards the digital composite signal to the output terminal as it is. Thus, the circuit of FIG. 8 functions as an upper limit circuit of a digital composite signal.

[Sixth Embodiment]

Figure 9:
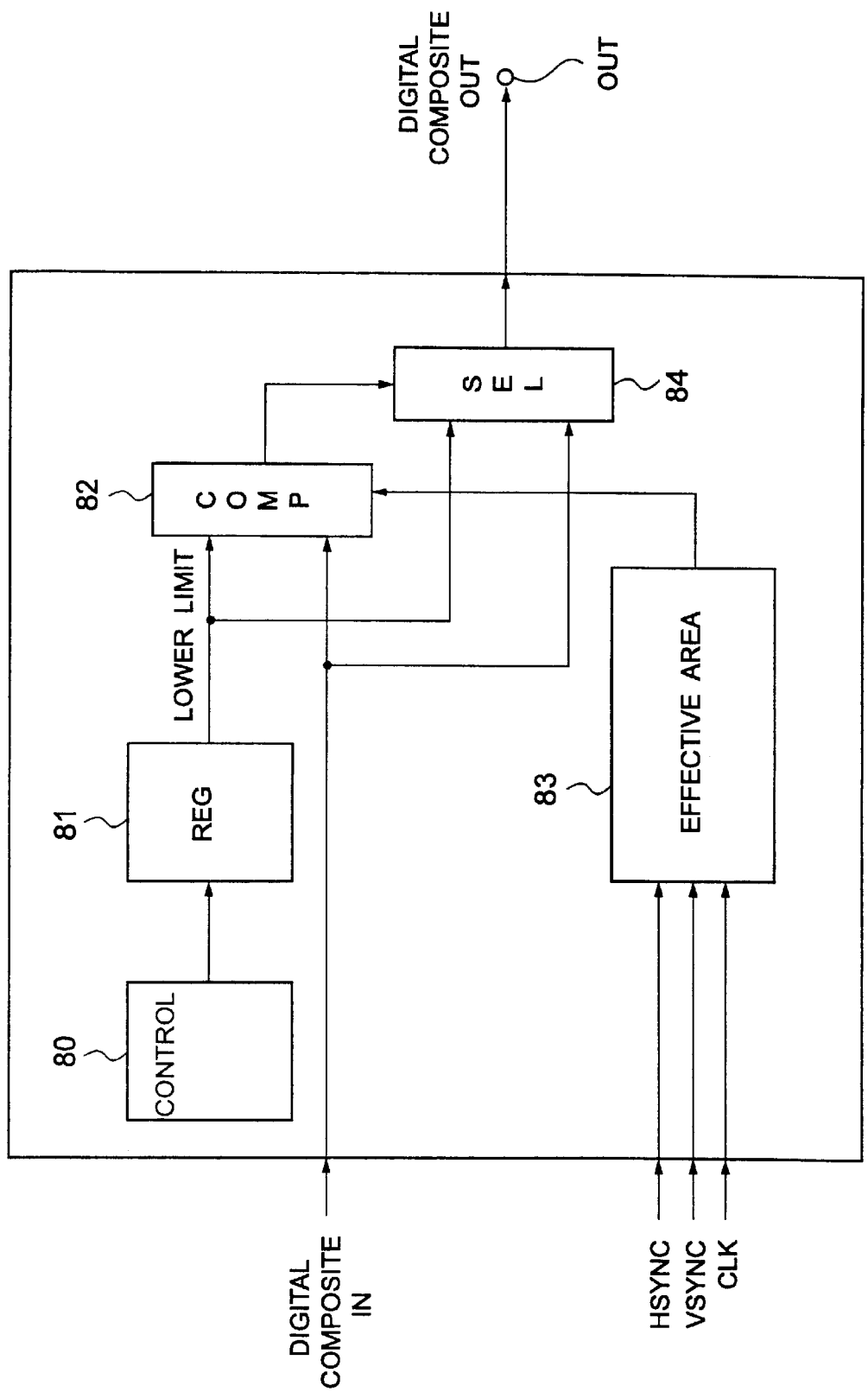
FIG. 9 is a diagram showing the construction of a video signal processing apparatus according to a sixth embodiment of the present invention.

FIG. 9 shows the construction of a lower limit circuit used in a video signal processing apparatus according to a sixth embodiment of the present invention, wherein the lower limit circuit generally includes a control unit 80 including therein a processor, a register 81 setting up a lower limit value under control of the control unit 80, a comparator (COMP) 82, an effective area indicator 83, and a selector (SE) 84.

Referring to FIG. 9, the lower limit circuit is supplied with a digital composite signal, a horizontal synchronization signal HSYNC, a vertical synchronization signal VSYNC and a sampling clock signal CLK, wherein the digital composite signal is received by the comparator 82 and the comparator 82 compares the digital composite signal with the lower limit value supplied from the register 81. In an example, both the digital composite signal and the lower limit value in the register 81 are represented by an 8-bit data format. Further, the effective area indicator 83 is supplied with the horizontal synchronization signal HSYNC, the vertical synchronization signal VSYNC and the clock signal CLK and defines an effective area in which the horizontal blanking interval and the vertical blanking interval are excluded. Thereby, the effective area indicator 83 controls the comparator 82 and the comparator 82 carries out the foregoing comparison in the effective area thus defined.

When the value of the incoming digital composite signal exceeds the foregoing lower limit value in the negative voltage direction, the comparator 82 controls the selector 84 such that the selector 84 produces an output signal fixed to the foregoing lower limit value at an output terminal. When the value of the incoming digital composite signal does not exceed the foregoing lower limit value, on the other hand, the selector 84 forwards the digital composite signal to the output terminal as it is. Thus, the circuit of FIG. 9 functions as a lower limit circuit of a digital composite signal.

[Seventh Embodiment]

Figure 10:
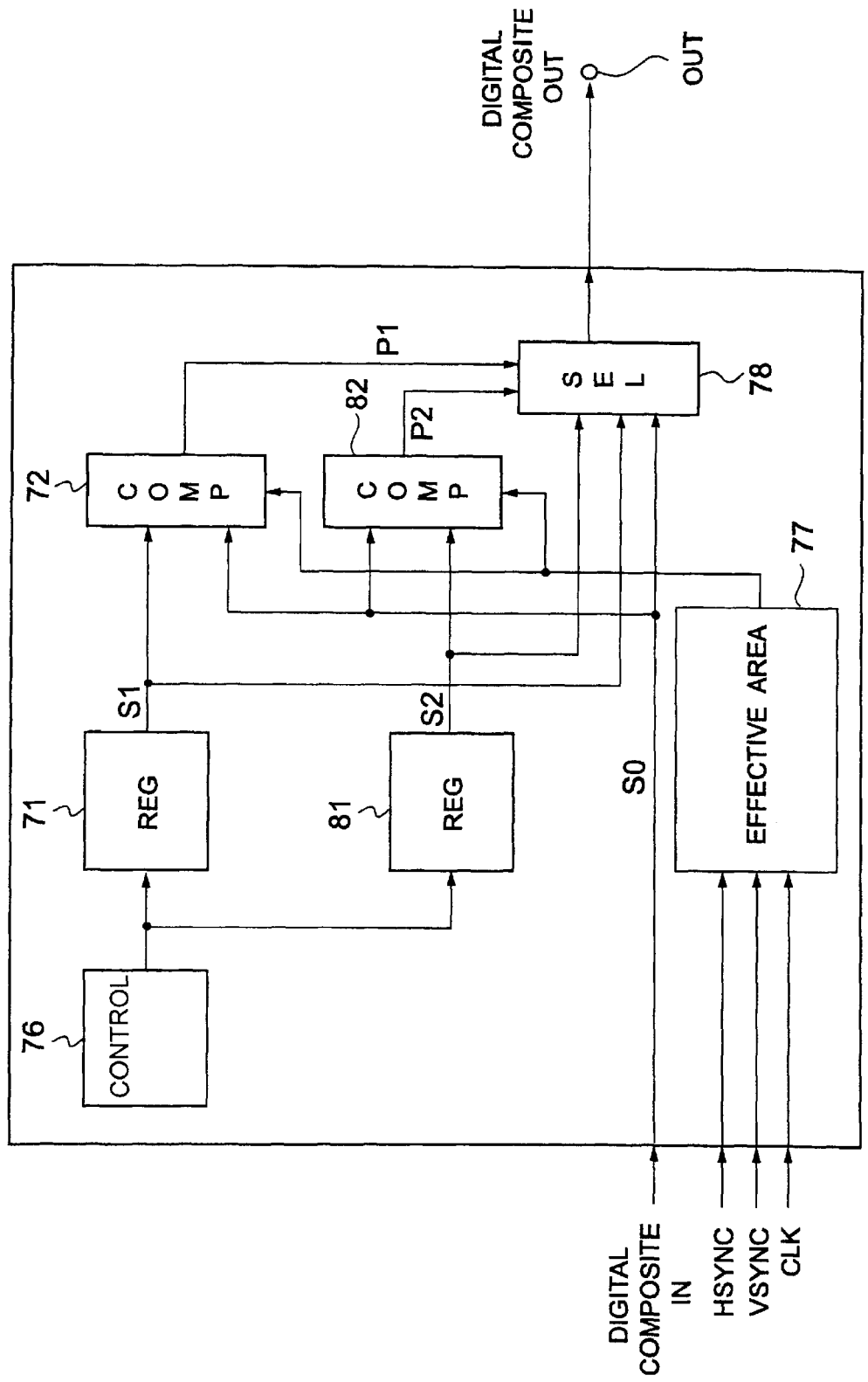
FIG. 10 is a diagram showing the construction of a video signal processing apparatus according to a seventh embodiment of the present invention.

FIG. 10 shows the construction of an upper limit and lower limit circuit used in a video signal processing apparatus according to a seventh embodiment of the present invention, wherein those parts corresponding to the parts described previously are designated by the same reference numerals and the description thereof will be omitted.

Referring to FIG. 10, the upper limit and lower limit circuit of the present embodiment includes a control unit 76 similar to the control unit 70 or 80 in addition to the register 71 and the register 81, for setting up an upper limit value S1 and a lower limit value S2 respectively. Thereby, the register 71 supplies the upper limit value S1 to the comparator 72 while the register 81 supplies the lower limit value S2 to the comparator 82, and the comparator 72 compares the value of an incoming digital composite signal So with the upper limit value S1 from the register 71. Similarly, the comparator 82 compares the value of the incoming digital composite signal S0 with the lower limit value S2 from the register 81.

Further, the upper limit and lower limit circuit of FIG. 10 includes an effective area indicator 77 for defining an effective area in which the horizontal blanking interval and the vertical blanking interval are excluded. The effective area indicator 77 thereby controls the comparators 72 and 82, while the comparators 72 and 82 in turn controls a selector 78 by respective output signals P1 and P2, such that the selector 78 supplies the upper limit value S1 in the register 71 to the output terminal when the value of the incoming digital composite video signal S0 exceeds the upper limit value S1 and such that the selector 78 supplies the lower limit value S2 in the register 81 to the output terminal when the value of the incoming digital composite video signal S0 exceeds the lower limit value S2 in the negative voltage direction. Otherwise, the selector 78 supplies the incoming digital composite signal S0 to the output terminal as it is.

In more detail, the comparator 72 produces the output signal P1 with the value "0" when there holds a relationship S0>S1, while the comparator 82 produces the output signal P2 with the value "0" when there holds a relationship S0<S2. Further, the selector 78 selectively supplies the incoming digital composite signal S0 to the output terminal when there holds a relationship P1="1" and P2="1," while the selector 78 selectively supplies the upper limit value S1 of the register 71 to the output terminal when there holds a relationship P1="0" and P2="1." Further, the selector 78 selectively supplies the lower limit value S2 of the register 81 to the output terminal when there holds a relationship P1="1" and P2="0."

Thus, the circuit of FIG. 10 acts as a digital limiter limiting the upper limit and the lower limit of the incoming digital composite video signal.

Figure 11:
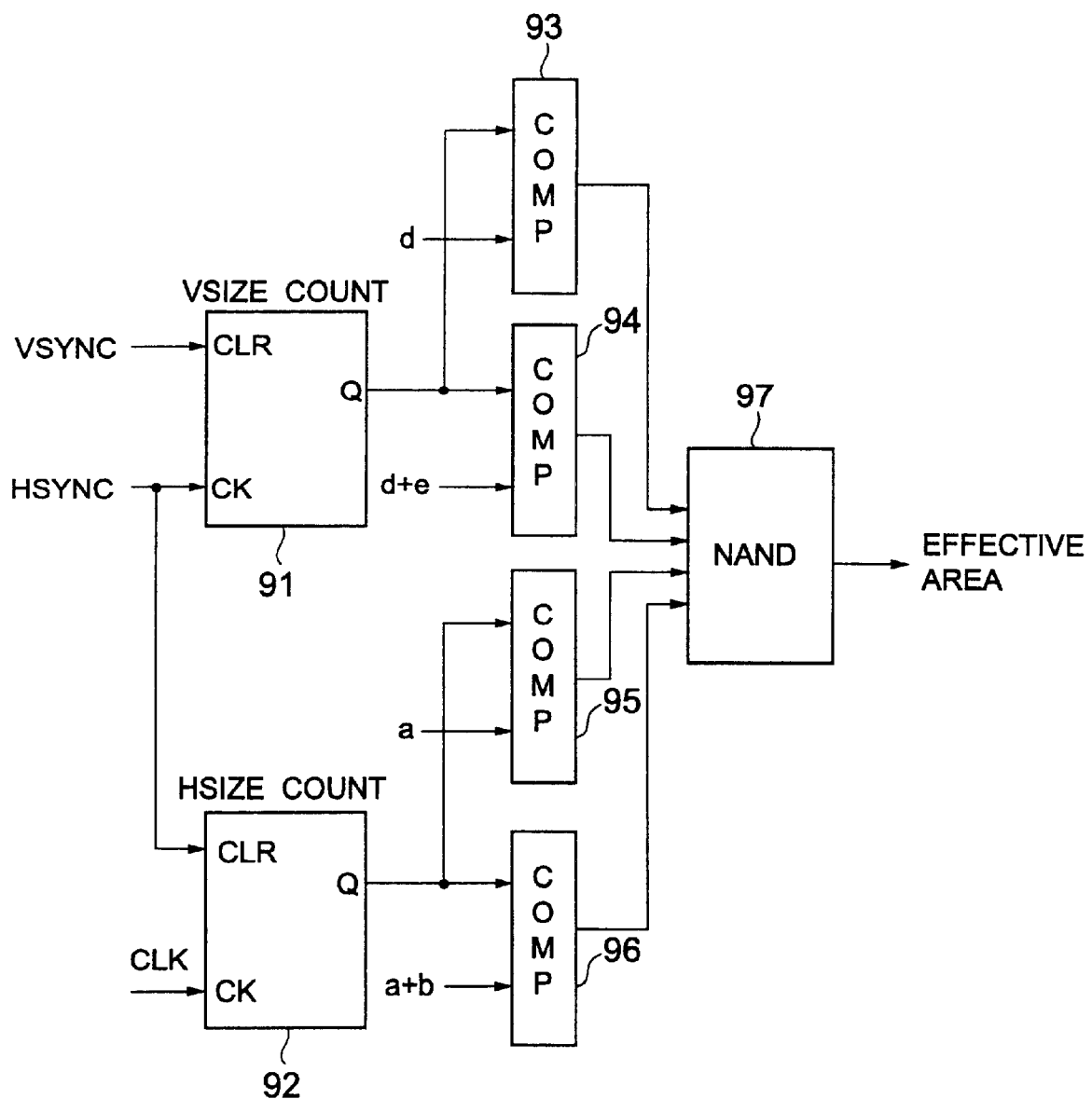
FIG. 11 is a diagram showing the construction of a part of the video signal processing apparatuses of FIGS. 8–10.

FIG. 11 shows the construction of the effective area indictor 73, 83 or 77 described previously, while FIG. 12 shows the function of the effective area indicator of FIG. 11.

Referring to FIG. 11, the effective area indicator includes a vertical size counter 91, a horizontal size counter 92, comparators 93–96 and a NAND circuit 97. The comparators 93–96 are supplied with various signals a–e corresponding to the intervals indicated in FIG. 12, wherein the signals a and c represent the horizontal blanking interval while d and f represent the vertical blanking interval. Further, the signal b represents a horizontal effective interval and the signal e represents a vertical effective interval. Further, it should be noted that FIG. 12 indicates the vertical size VS and horizontal size HS, wherein the vertical size VS and horizontal size HS are determined based on the horizontal synchronization signal HSYNC and the vertical synchronization signal VSYNC, respectively. It should be noted that the horizontal blanking interval and the vertical blanking interval are excluded from the horizontal effective interval b and the vertical effective interval e.

Figure 12:
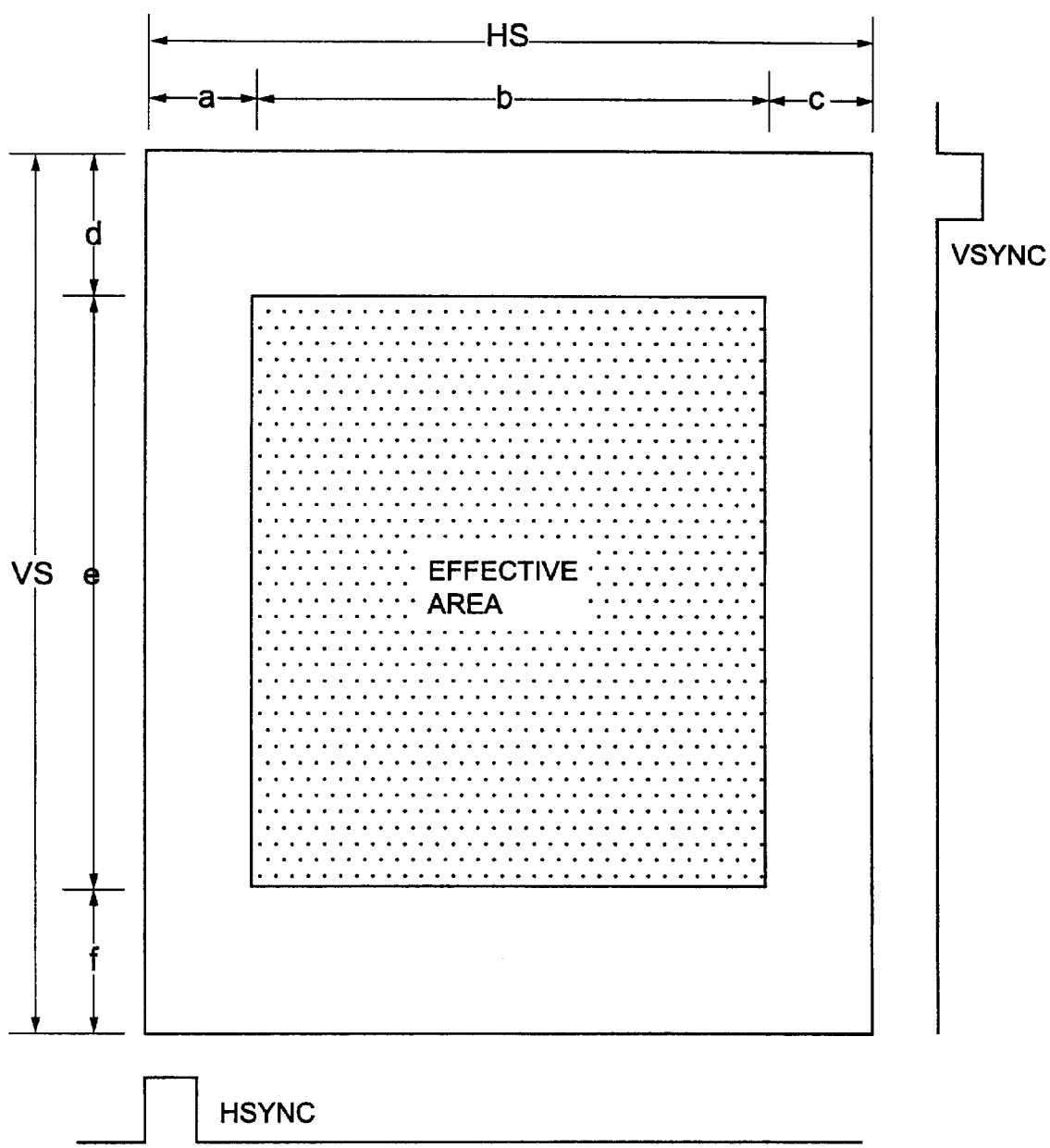
FIG. 12 is a diagram showing an effective area defined by the construction of FIG. 11.

Referring back to FIG. 11, the vertical synchronization signal VSYNC is supplied to a clear terminal CLR of the vertical size counter 91 and the horizontal synchronization signal HSYNC is supplied to a clock terminal CK of the vertical size counter 91, wherein the vertical size counter 91 counts up the number of the horizontal synchronization signals HSYNC supplied thereto. As a result of the counting up of the horizontal synchronization signals HSYNC in the vertical size counter 91, the vertical size VS indicated in FIG. 12 is obtained at an output terminal Q of the vertical size counter 91. In the horizontal size counter 92, the horizontal synchronization signal HSYNC is supplied to a clear terminal CLR thereof and a sampling clock signal CLK is supplied to a clock terminal CK. Thereby, the horizontal size HS is represented by the number of counts thus obtained at an output terminal Q of the horizontal size counter 92.

The comparator 93 thereby compares the vertical blanking interval d with the count number held in the vertical size counter 91 and produces an output "1" when the count number exceeds the vertical blanking interval d. Further, the comparator 94 compares a sum of the vertical blanking interval d and the vertical effective interval e with the count number of the vertical size counter 91 and produces an output "1" when the count number is smaller than the foregoing sum. Similarly, the comparator 95 compares the horizontal blanking interval a with the count number held in the horizontal size counter 92 and produces an output "1" when the count number exceeds the horizontal blanking interval a. Further, the comparator 96 compares a sum of the horizontal blanking interval a and the horizontal effective interval a with the count number of the horizontal size counter 92 and produces an output "1" when the count number is smaller than the foregoing sum.

Further, it should be noted that the NAND circuit 97 produces an output "0" when all the outputs of the comparators 93–96 have the logic value "1." In other words, the NAND circuit 97 selectively produces the output "0" in the horizontal effective interval b and in the vertical effective interval e indicated in FIG. 12. Thereby, the comparator 72 or 82 of FIGS. 8 and 9 or FIG. 10 carries out the comparing operation selectively in the interval in which the output of the NAND circuit 97 is "0."

[Eighth Embodiment]

It should be noted that the foregoing upper limit and lower limit circuit of the digital video signal is applicable also to a video signal processing apparatus that processes a digital component signal (Y, Cb, Cr) for limiting one or both of the upper and lower limits thereof.

In the event the amplitude Ey of the luminance signal Y in the digital component signal falls in the range of 0–0.1, the color difference signals Cb and Cr have respective amplitudes Eb and Er in the range of:

$$(Eb-Ey)=0.886--0.886;$$

and $$(Er-Ey)=0.701--0.701$$

By applying a normalization process to the above quantities such that (Eb–Ey) and (Er–Ey) fall in the range of 0.5, one obtains normalization coefficients Kb and Kr as:

$$Kb=0.5/0.886=0.564;$$

and $$Kr=0.5/0.701=0.713$$

Thereby, normalized color difference signal amplitudes Ecb and Ecr are obtains as $$Ecb=0.564(Eb-Ey);$$

and $$Ecr=0.713(Er-Ey).$$

By quantizing the normalized color difference signal amplitudes Ecb and Ecr thus obtained in 224 quantum levels, with the ground level or zero level set to a level 128, the following representation is obtained for quantized color difference signals Cb and Cr:

$$Cb=224[0.564(Eb-Ey)]+128; \quad (1)$$

and $$Cr=224[0.713(Er-Ey)]+128. \quad (2)$$

It should be noted that the quantized color difference signals Cb and Cr of Eqs. (1) and (2) are represented in 8-bit binary format with zero level set to 128. Thus, the quantized color difference signals Cb and Cr are converted to corresponding 8-bit binary numbers CB and CR according to the relationship below, such that the zero level of the color difference signals CB and CR coincides to zero:

$$CB=Cb-128;$$

and $$CR=Cr-128.$$

Meanwhile, the amplitude Ec of a modulated color signal is represented by $$Ec = [(Eb-Ey)/2.03]*\sin\_t + [(Er-Ey)/1.14]*\cos\_t, \quad (3)$$

wherein it can be seen that the color signal C has an amplitude characterized by a positive peak value of +Ec and a negative peak value of –Ec. In Eq. (3), it should be noted that the denominator numerals 2.03 and 1.14 are used for normalizing the amplitude Ec such that the amplitude Ec of the signal C modulated according to the I,Q process becomes identical with the amplitude Ec of the signal C modulated by the color signals (R-Y) and (B-Y). See ITU-R Rec.601.

From Eq. (3), the amplitude Ec of the signal C is obtained according to the vector synthesis process as $$Ec = \text{SQR}\,[\{(Eb-Ey)/2.03\}^2 + \{(Er-Ey)/1.14\}^2], \quad (4)$$

where SQR represents a square root of the quantity in the bracket [ ].

Using Eq. (1), a color difference signal amplitude (Eb–Ey) is represented as $$(Eb-Ey)=CB/(224*0.564). \quad (5)$$

Further, from Eq. (2), a color difference signal amplitude (Er–Ey) is represented as $$(Eb-Ey)=CR/(224*0.713). \quad (6)$$

Thus, by substituting Eqs.(5) and (6) into Eq. (4), one obtains the amplitude of the color signal Ec as $$Ec = \text{SQR}\,[(CB/256.46208)^2 + (CR)/182.07168)^2]. \quad (7)$$

It should be noted that the foregoing representation of the luminance signal amplitude Ey represents the amplitude level of the luminance signal normalized by the normalization coefficient to the range of 0–0.1. As the actual level of the luminance signal Y is in the range of 0–0.714 (V), the actual level of the color signal C is given also by multiplying the coefficient 0.714 to the representation of Eq. (7), as:

$$Ec = \text{SQR}\,[(CB/256.46208)^2 + (CR)/182.07168)^2]*0.714. \quad (8)$$

In view of the corresponding relationship of 1(V)=140 (IRE) or 1(IRE)=0.00714(V) between the level represented in terms of (V) and the level represented in terms of (IRE), the relationship of Eq. (8) is converted as:

$$Ec = \text{SQR}\,[(CB/256.46208)^2 + (CR)/182.07168)^2]*100. \quad (9)$$

Further, the amplitude of the luminance signal Y is represented as $$Ey(IRE)=[(Y-16)/219]*100, \quad (10)$$

after quantization with 219 quantum levels, with the black level set to the level 16 and the white level set to the level 235.

Thus, in the upper limit circuit for use in such a digital video signal processing system, the over-level of the digital video signal is limited when the condition A<Ey+Ec is met, wherein A represents the upper limit value represented in terms of IRE. More specifically, an amplitude factor [(A−Ey)/Ec] of the color signal is applied for level limitation as follows:

$$CB*(A-Ey)/Ec=(Cb-128)*(A-Ey)/Ec, \quad (11)$$

and $$CR*(A-Ey)/Ec=(Cr-128)*(A-Ey)/Ec. \quad (12)$$

In terms of binary representation with the zero level set to 128, Eqs. (11) and (12) are represented as $$(CB-128)*(A-Ey)/Ec+128, \quad (13)$$

and $$(CR-128)*(A-Ey)/Ec+128, \quad (14)$$

respectively.

Thus, Eqs. (13) and (14) are used to limit the amplitude of the color difference signals Cb and Cr.

Figure 13:
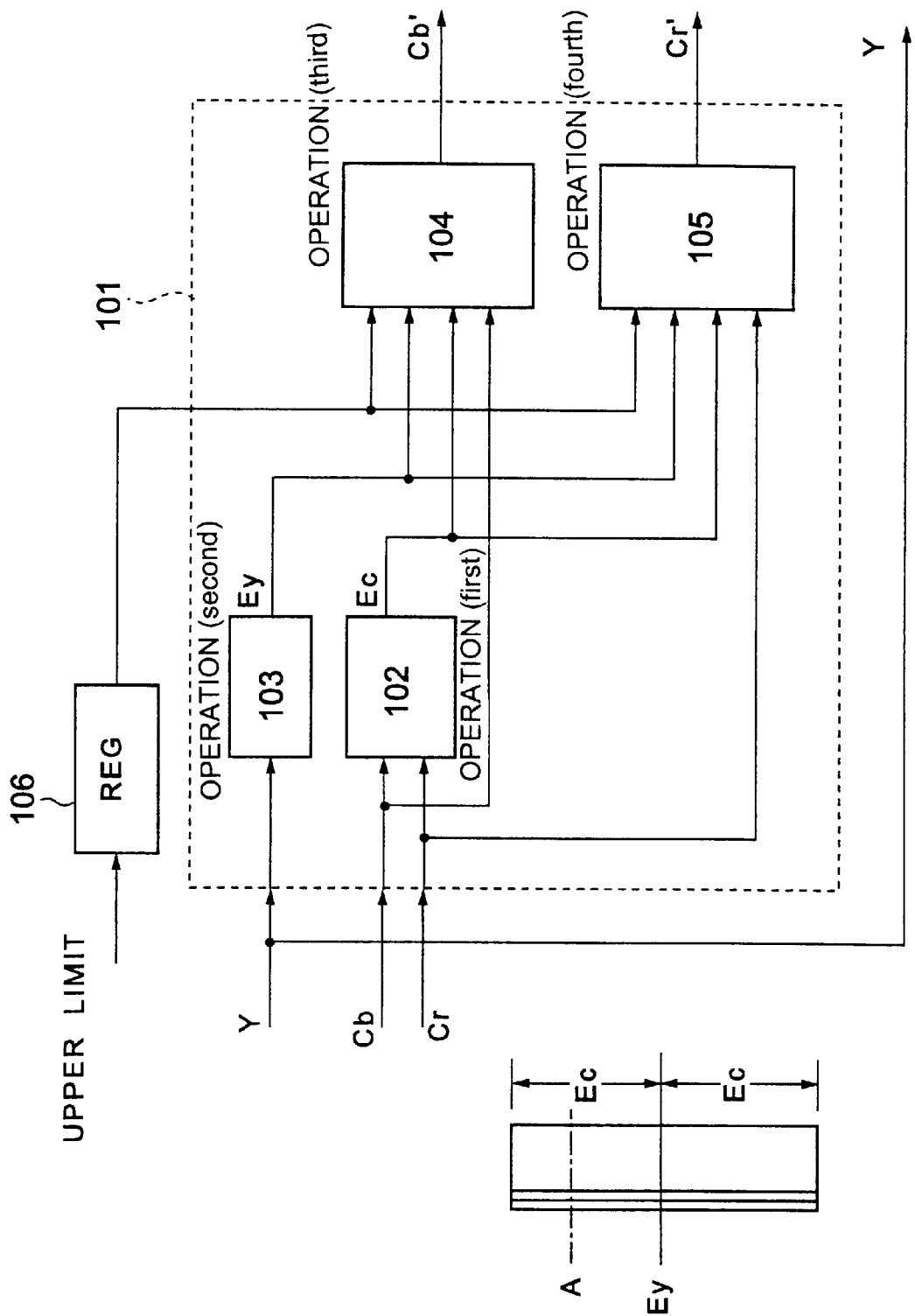
FIG. 13 is a diagram showing the construction of a video signal processing apparatus according to an eighth embodiment of the present invention.

FIG. 13 shows the construction of an upper limit circuit of a video signal processing apparatus according to the present eighth embodiment, wherein it should be noted that the limit circuit of FIG. 13 carries out the limiting of the digital video signal according to the relationship of Eqs. (9), (10), (13) and (14).

Referring to FIG. 13, the limit circuit is formed of an operational unit 101 implemented in the form of a DSP (digital signal processor), wherein it should be noted that the operational unit 101 includes a first operational unit 102 carrying out the process of Eq. (9), a second operational unit 103 carrying out the process of Eq. (10), a third operational unit 104 carrying out the process of Eq. (13), and a fourth operational unit 105 carrying out the process of E. (14). The operational units 102–105 perform the function of the operational unit 101. Further, the limit circuit includes a register 106 holding the upper limit value A(IRE), wherein the upper limit value A (IRE) is set in the register 106 by a processor not illustrated.

Thus, the color difference signals Cb and Cr constituting the color component signal (Y, Cb, Cr) are supplied to the first operational unit 102, wherein the first operational unit 102 calculates the amplitude of the color signal Ec(IRE) according to the relationship of Eq. (9). Further, the luminance signal Y is supplied to the second operational unit 103, wherein the second operational unit 103 calculates the amplitude Ey(IRE) according to the relationship of Eq. (10). Further, the third operational unit 104 is supplied with the upper limit value A (IRE), the luminance signal amplitude Ey(IRE) from the second operational unit 103, the color signal amplitude Ec(IRE) from the first operational unit 102 and further with the color difference signal Cb, wherein the third operational unit 104 produces an amplitude-limited color difference signal Cb' by multiplying the amplitude factor [(A−Ey)/Ec] of the color signal from the relationship of Eq. (13).

Similarly, the fourth operational unit 105 is supplied with the upper limit value A (IRE), the luminance signal amplitude Ey(IRE) from the second operational unit 103, the color signal amplitude Ec(IRE) from the first operational unit 102 and further with the color difference signal Cr, wherein the fourth operational unit 105 produces an amplitude-limited color difference signal Cr, by multiplying the amplitude factor [(A−Ey)/Ec] of the color signal from the relationship of Eq. (13). The amplitude-limited color difference signal Cr' does not exceed the foregoing upper limit value A. The limit circuit of FIG. 13 passes the incoming luminance signal Y therethrough as it is.

[Ninth Embodiment]

In the foregoing embodiment, the upper limiter can be converted to a lower limiter by multiplying the quantity (−B+Ey)/Ec to the color signal Ec when the condition B>Ey−Ec is met, where B (IRE) represents the lower limit. Thereby, one obtains the relationship:

$$CB*(-B+Ey)/Ec=(Cb-128)*(-B+Ey)/Ec, \quad (15)$$

and $$CR*(-B+Ey)/Ec=(Cr-128)*(-B+Ey)/Ec. \quad (16)$$

respectively in correspondence to Eqs. (11) and (12).

In terms of 8-bit binary format, with the zero level set to 128, Eq. (15) and (16) are represented respectively as $$[(Cb-128)*(-B+Ey)/Ec]+128, \quad (17)$$

and $$[(Cr-128)*(-B+Ey)/Ec]+128. \quad (18)$$

Thus, by using Eqs. (17) and (18), the amplitude of Cb and Cr can be reduced.

Figure 14:
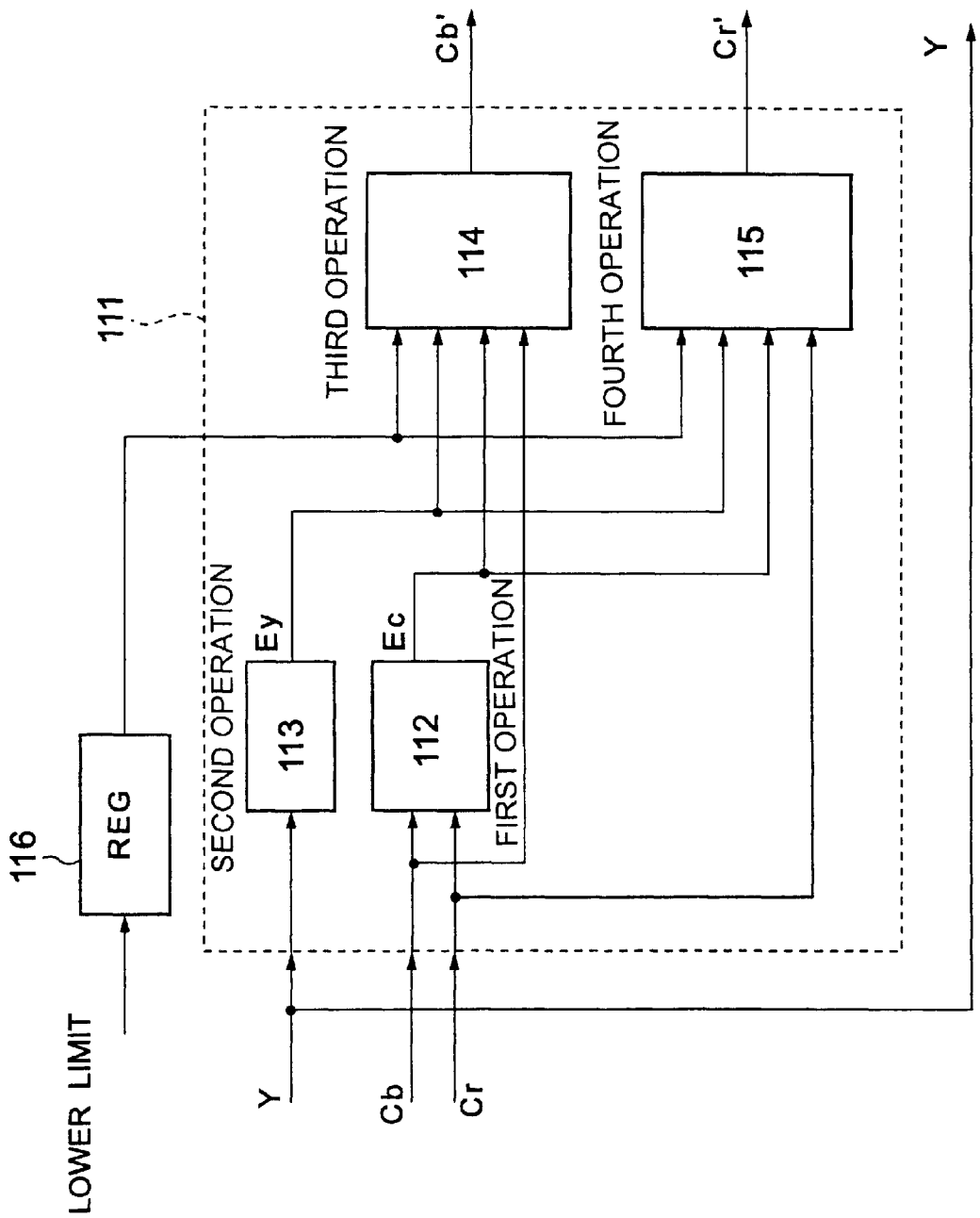
FIG. 14 is a diagram showing the construction of a video signal processing apparatus according to a ninth embodiment of the present invention.

FIG. 14 shows the construction of a lower limit circuit of a video signal processing apparatus according to the present, wherein it should be noted that the limit circuit of FIG. 14 carries out the limiting of the digital video signal according to the relationship of Eqs. (9), (10), (17) and (18).

Referring to FIG. 14, the limit circuit is formed of an operational unit 111 implemented in the form of a DSP (digital signal processor), wherein it should be noted that the operational unit 111 includes a first operational unit 112 carrying out the process of Eq. (9), a second operational unit 113 carrying out the process of Eq. (10), a third operational unit 114 carrying out the process of Eq. (17), and a fourth operational unit 115 carrying out the process of E. (18). The operational units 112–115 perform the function of the operational unit 111. Further, the limit circuit includes a register 116 holding the lower limit value B (IRE), wherein the lower limit value B (IRE) is set in the register 116 by a processor not illustrated.

Thus, the color difference signals Cb and Cr constituting the color component signal (Y, Cb, Cr) are supplied to the first operational unit 112, wherein the first operational unit 112 calculates the amplitude of the color signal Ec(IRE) according to the relationship of Eq. (9). Further, the luminance signal Y is supplied to the second operational unit 113, wherein the second operational unit 113 calculates the amplitude Ey(IRE) according to the relationship of Eq. (10). Further, the third operational unit 114 is supplied with the upper limit value B (IRE), the luminance signal Ey(IRE) from the second operational unit 113, the color signal Ec(IRE) from the first operational unit 112 and further with the color difference signal Cb, wherein the third operational unit 114 produces an amplitude-limited color difference signal Cb, by multiplying the amplitude factor [(−B+Ey)/Ec)] of the color signal from the relationship of Eq. (17).

Similarly, the fourth operational unit 115 is supplied with the lower limit value B (IRE), the luminance signal amplitude Ey(IRE) from the second operational unit 103, the color signal amplitude Ec(IRE) from the first operational unit 102 and further with the color difference signal Cr, wherein the fourth operational unit 105 produces an amplitude-limited color difference signal Cr' by multiplying the amplitude factor [(−B+Ey)/Ec)] of the color signal from the relationship of Eq. (18). The amplitude-limited color difference signal Cr' does not exceed the foregoing lower limit value B in the negative voltage direction. The limit circuit of FIG. 14 passes the incoming luminance signal Y therethrough as it is.

Figure 15:
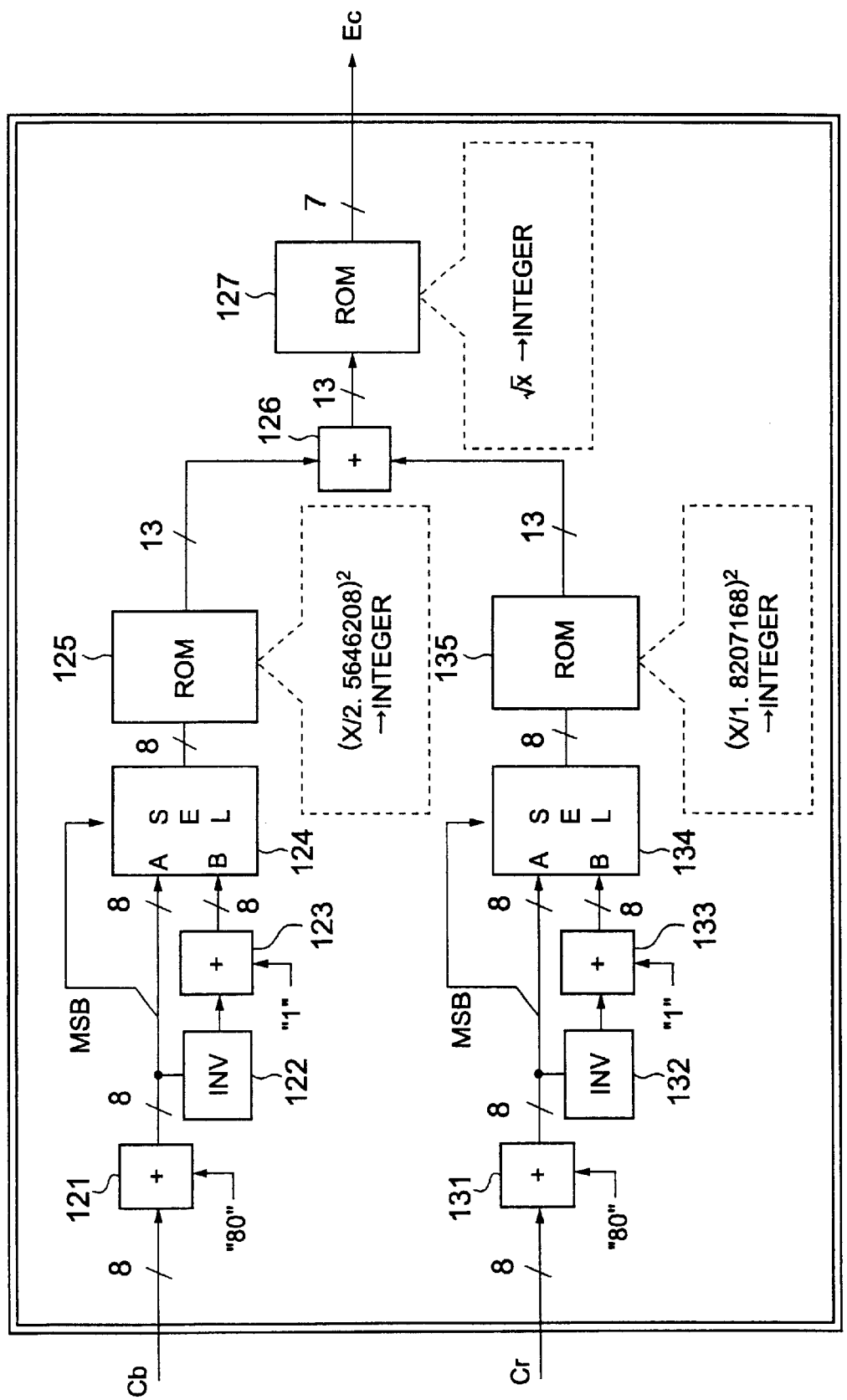
FIG. 15 is a diagram showing the construction of a processing unit conducting an operation.

FIG. 15 shows the construction of the operational unit corresponding to the operational unit 102 of FIG. 13 or 112 of FIG. 14 carrying out the process of Eq. (9) as implemented in the form of hardware.

Referring to FIG. 15, the operational unit includes adders 121, 123, 126, 131 and 133, inverters 122 and 132, selectors 124 and 134, and read-only memories 125, 135 and 127, wherein the read-only memory 125 produces an integer part of the quantity $(X/2.5646208)^2$ as output data for given input data X, by using the data X as address data. Similarly, the read-only memory 135 produces an integer part of the quantity $(X/1.8207168)^2$ as output data for given input data X, by using the data X as address data. Further, the read-only memory 127 produces a square root of the input data X, by using the data X as address data.

On the other hand, the adders 121 and 123, the inverter 122 and the selector 124 converts the incoming color difference signal Cb into a binary color difference signal CB with a plus/minus sign. Similarly, the adders 131 and 133, the inverter 132 and the selector 134 converts the incoming color difference signal Cr into a binary color difference signal CR with a plus/minus sign.

In more detail, the incoming the color difference signal Cb is added with a hexadecimal number "80" (corresponding to a decimal number "128") in the adder 121, and the color difference signal thus processed is inverted by the inverter 122. After inversion in the inverter 122, the inverted color difference signal is added with a number "1" in the adder 123 to form a complement, and any one of the output of the adder 121 and the output of the adder 123 is selected by the selector 124 according to the MSB of the output of the adder 121 indicating the polarity.

Similarly, the incoming the color difference signal Cr is added with a hexadecimal number "80" (corresponding to a decimal number "128") in the adder 131, and the color difference signal thus processed is inverted by the inverter 132. After inversion in the inverter 132, the inverted color difference signal is added with a number "1" in the adder 133 to form a complement, and one of the output of the adder 131 and the output of the adder 133 is selected by the selector 134 according to the MSB of the output of the adder 131 indicating the polarity.

The output of the selector 124 is used to drive the read-only memory 125, and the read-only memory 125 produces output data as noted before. Similarly, the output of the selector 135 is used to drive the read-only memory 135, and the read-only memory 135 produces output data as noted before. The output of the read-only memory 125 and the output of the read-only memory 135 are added with each other in the adder 126, and the output data of the adder 126 drives the read-only memory 127. Thereby, the read-only memory 127 produces an output indicating the amplitude of the color signal Ec (IRE) according to the result of operation of Eq. (9).

Figure 16:
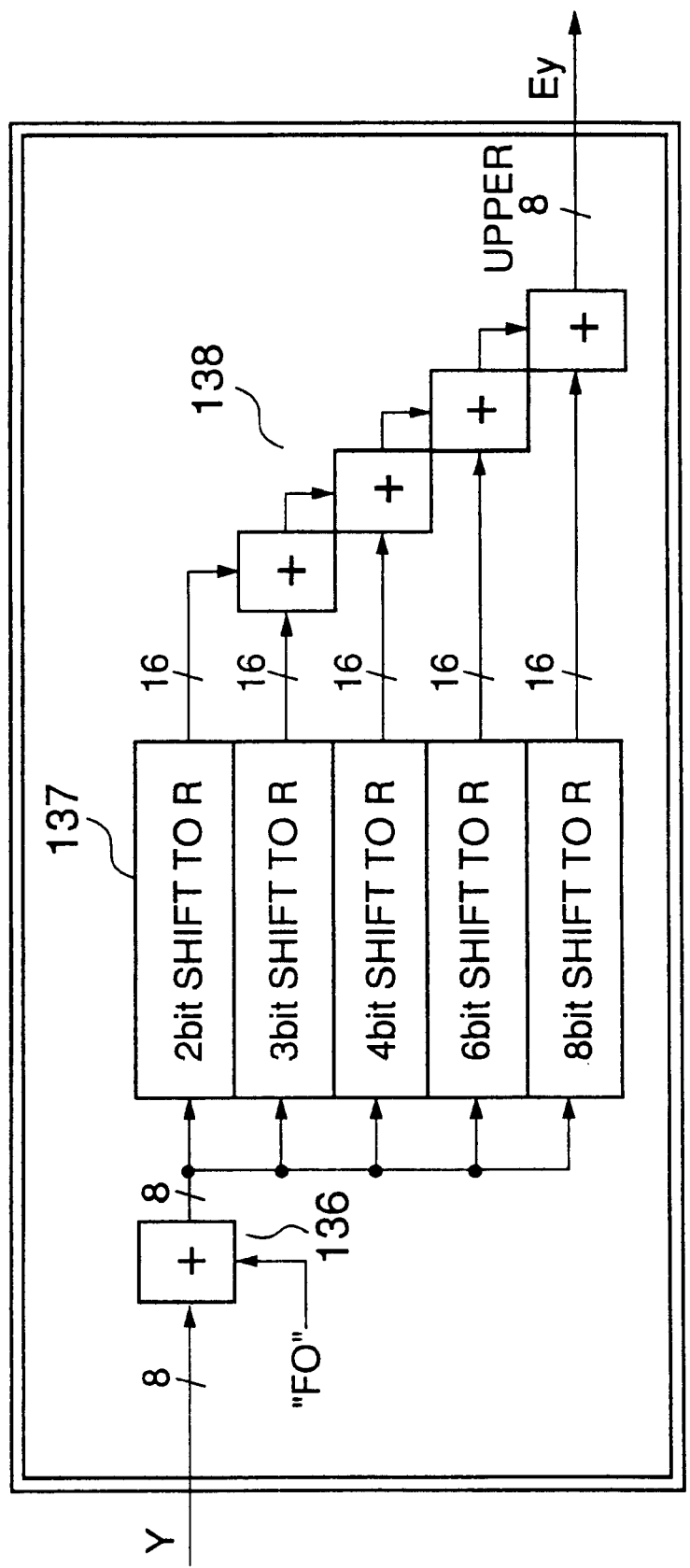
FIG. 16 is a diagram showing the construction of a processing unit conducting an operation.

FIG. 16 shows the construction of the operational unit for conducting the process of Eq. (10) such as the operational unit 103 of FIG. 13 or the operational unit 113 of FIG. 14 as implemented in the form of hardware, wherein the construction of FIG. 16 includes an adder 136, a shift register 137 and another adder 138.

Referring to FIG. 16, the incoming luminance signal Y is added with a hexadecimal number "F0" in the adder 136 and is supplied to the shift resister 137, wherein the shift register 137 carries out, together with the adder 138, an operation of (1/4)+(1/8)+(1/16)+(1/64)+(1/256), and the luminance signal Ey is obtained as an approximate value of a dividing operation conducted by a denominator factor 219.

Figure 17:
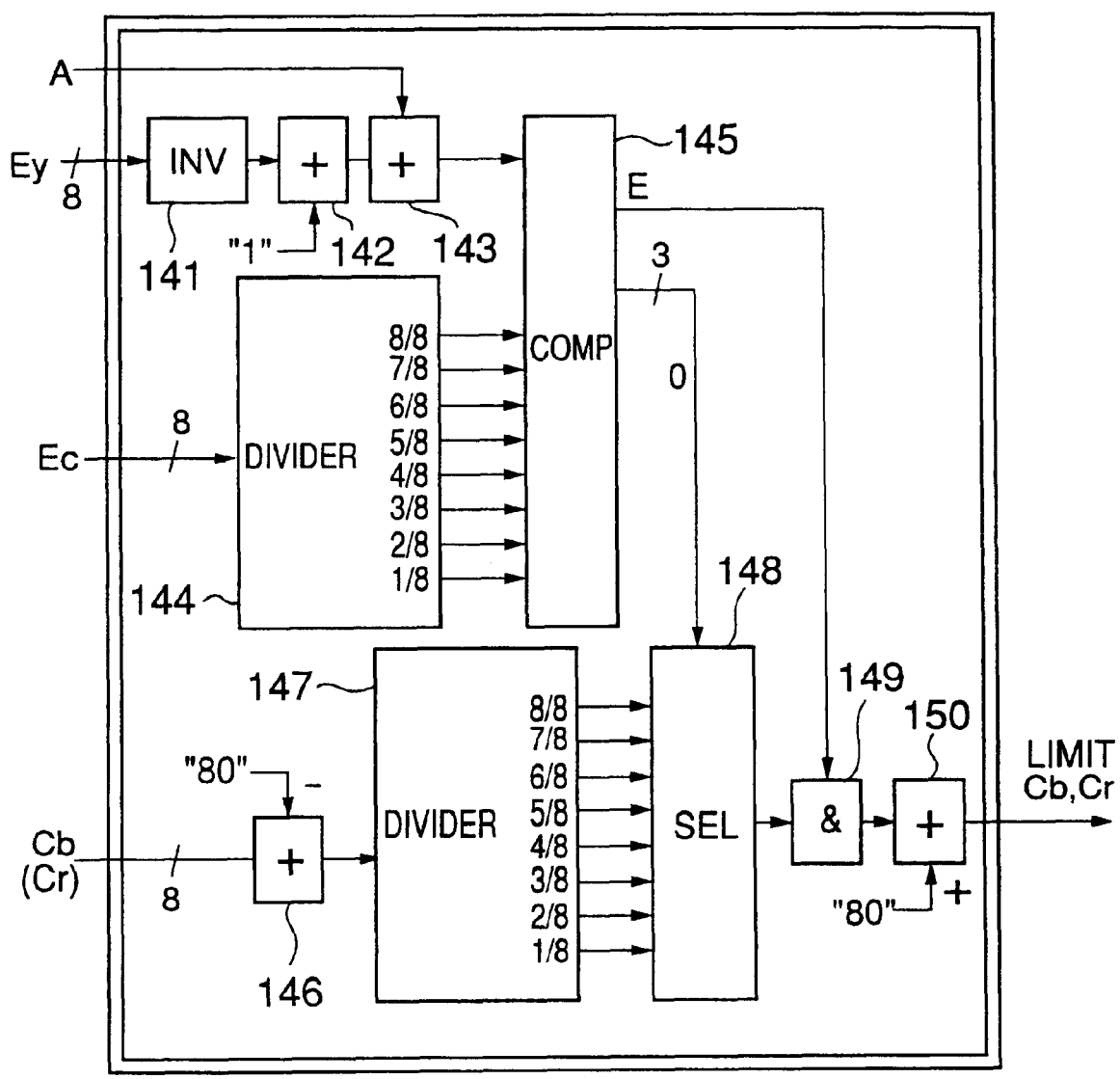
FIG. 17 is a diagram showing the construction of a processing unit conducting an operation.

FIG. 17 shows the construction of the operational unit for conducting the process of Eq. (13) or (14) such as the operational unit 104 or 105 of FIG. 13 as implemented in the form of hardware, wherein the construction of FIG. 17 includes an inverter 141, adders 142, 143, 146 and 150, dividers 144 and 147, a comparator 145, a selector 148 and an AND circuit 149.

In the construction of FIG. 17, it should be noted that the operational unit of Eq. (13) is obtained by supplying thereto the upper limit value A, the luminance signal Ey, the color signal Ec and the color difference signal Cb, while the operational unit of Eq. (14) is obtained by supplying thereto the upper limit value A, the luminance signal amplitude Ey, the color signal amplitude Ec and the color difference signal Cr.

In the operational unit of FIG. 17, it should be noted that the amplitude factor (A−Ey)/Ec of the color signal is obtained approximately in eight steps (1/8–8/8) in view of the fact that both the numerator and the denominator are variables. Thus, the first divider 144 divides the incoming color signal Ec in eight different ways with respective denominators. Further, the adder 146 subtracts a hexadecimal number "80" corresponding to a decimal number "128" from the incoming color difference signal Cb or Cr and the divider 147 divides the output of the adder 146 in eight different ways, with respective denominators.

The output of the divider 144 is compared with the signal (A−Ey) from the adder 143 in the comparator 145 and the comparator 145 produces a selection signal of three-bit format indicative of the result of the comparison. Further, the comparator 145 produces an enable signal E and supplies the same to the AND circuit 149.

The three-bit output signal of the comparator 145 is then supplied to the selector 148, wherein the selector 148 selects one of the eight output signals of the divider 147 and supplies the same to the AND circuit 149 under control of the output signal O from the comparator 145. The selected output of the selector 148 is then supplied to the adder 150 through the AND circuit 149 under control of the enable signal E supplied from the comparator 145, wherein the adder 150 adds a hexadecimal number "80" corresponding to a decimal number "128" to the selected signal. The output of the adder 150 thus formed thereby forms the color difference signal Cb or Cr in which the amplitude limitation is applied with respect to the upper limit.

Figure 18:
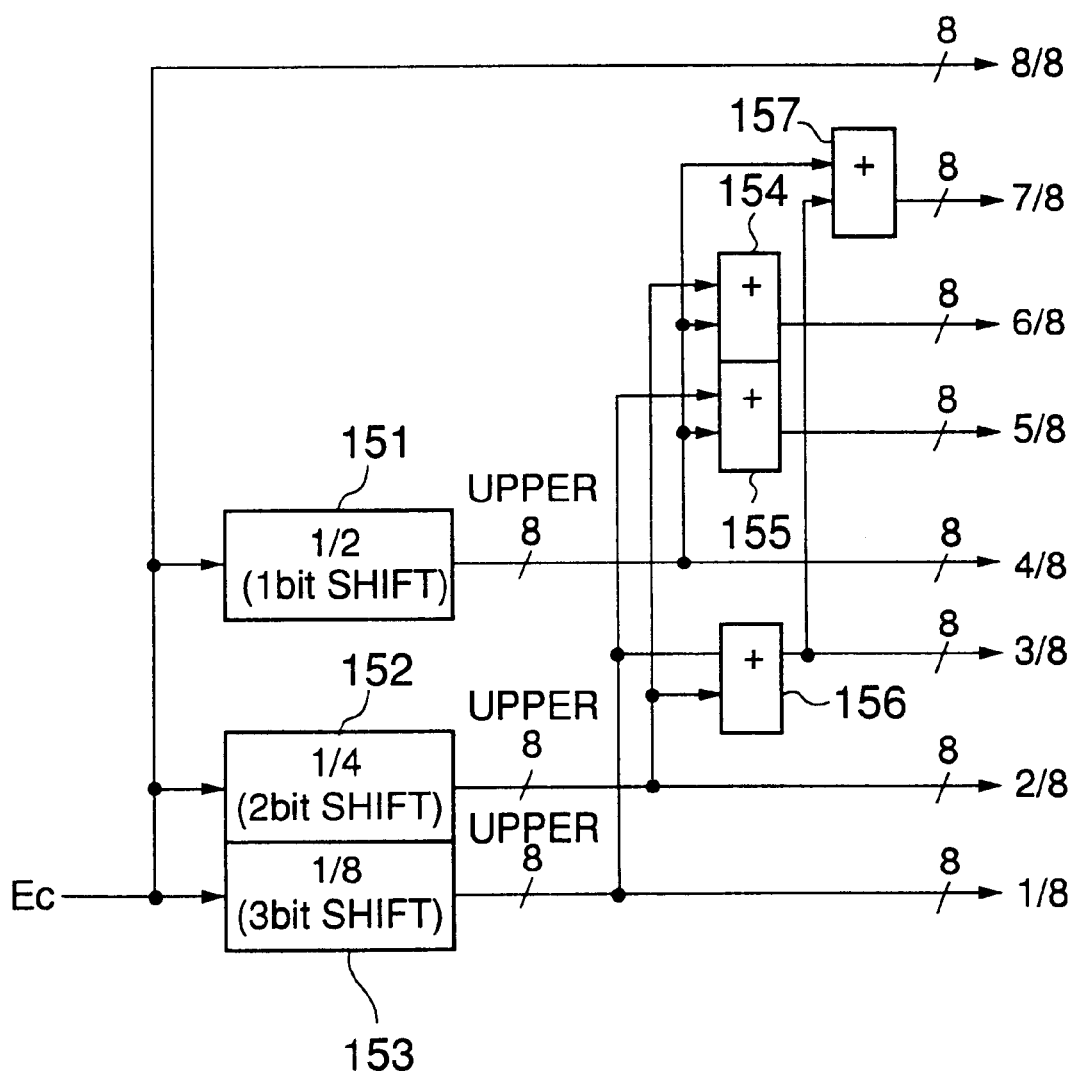
FIG. 18 is a diagram showing the construction of a processing unit conducting an operation.

FIG. 18 shows the construction of the divider 144 used in the construction of FIG. 17 for dividing the color signal amplitude Ec.

Referring to FIG. 18, the divider 144 includes shift registers 151–153 and adders 154–157, wherein the color signal C of eight-bit format is supplied to each of the shift resisters 151–153, and the shift register 151 produces the upper eight bit data thereof as an output data after one bit shift in the right direction. Thereby, a 1/2-divided color signal having a level of Ec/2 or 4/8×Ec is obtained as the output of the shift register 151. Further, the shift register 152 produces the upper eight bit data of the incoming eight-bit color signal C after a two-bit shift in the right direction, to produce a 1/4-divided color signal having a level of Ec/4 or 2/4×Ec. Further, the shift register 153 produces the upper eight bit data of the incoming eight-bit color signal C after a three-bit shift in the right direction, to produce a 1/8-divided color signal having a level of Ec/8 or 1/8×Ec.

Thus, by adding the outputs of the shift registers 151 and 153 at the adder 156, a 3/8-divided output of the incoming color signal C is obtained. Similarly, by adding the outputs of the shift resisters 151 and 153 at the adder 155, a 5/8-divided output of the incoming color signal C is obtained. Further, by adding the outputs of the shift resisters 151 and 152 at the adder 154, a 6/8-divided output of the incoming color signal C is obtained. Further, by adding the outputs of the shift resisters 151 and 156 at the adder 157, a 7/8-divided output of the incoming color signal C is obtained.

Figure 19:
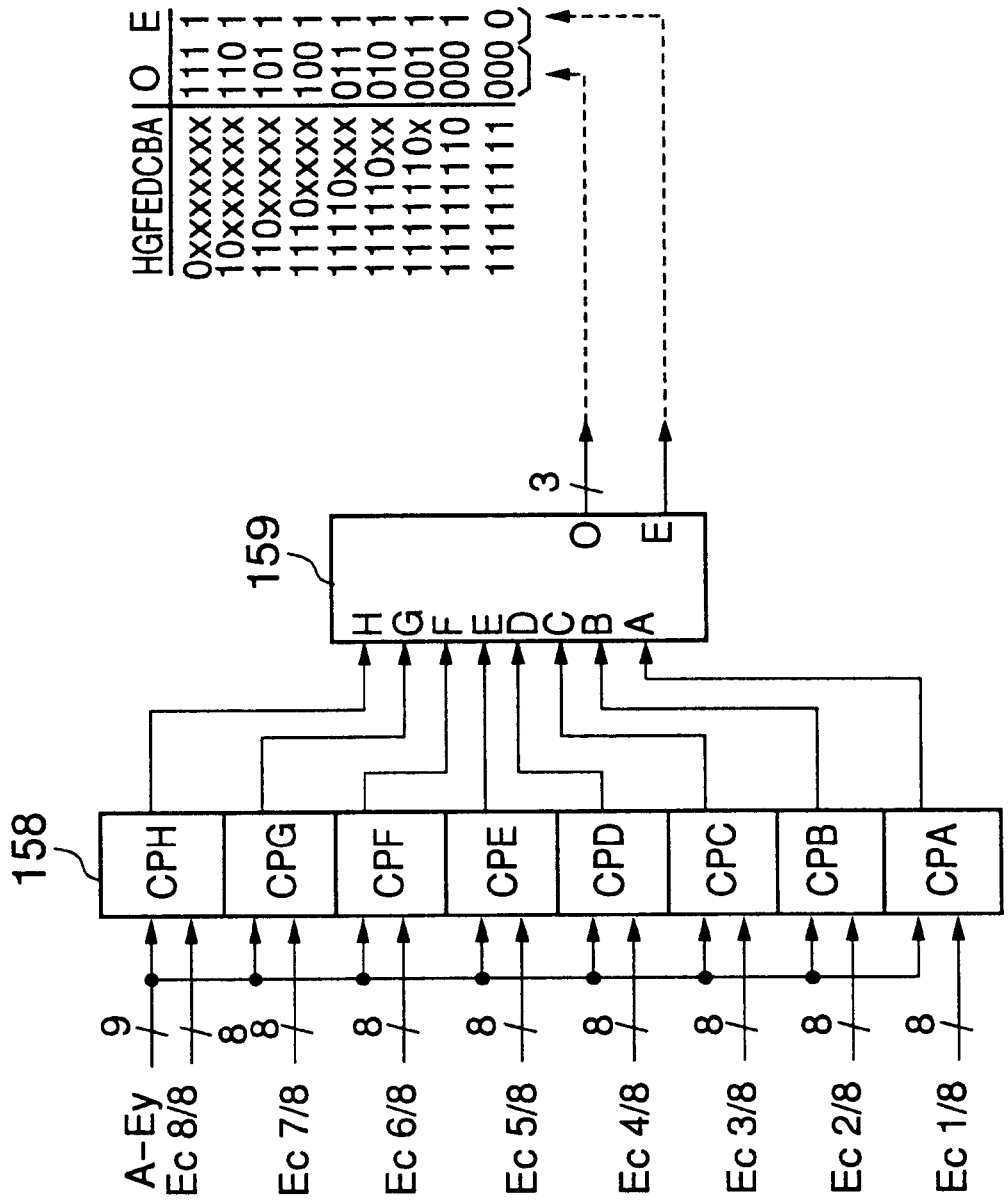
FIG. 19 is a diagram showing the construction of a comparator.

FIG. 19 shows the construction of the comparator 145 used in FIG. 17.

Referring to FIG. 19, the comparator 145 includes a comparator group 158 including therein comparator elements CPA–CPH and a priority encoder 159, wherein each of the comparator elements CPA–CPH compares the value (A–Ey) with the value Ec(i/8)(i=1–8) and produces an output "0" when the condition (A–Ey)>Ec(i/8) is met. Otherwise, the comparator elements CPA–CPH produce an output "1."

It should be noted that the priority encoder 159 produces a 3-bit selection signal O having a value "111" when there holds a relationship (A–Ey)>Ec(8/8), as the input terminal H receives an input "0." See the table of FIG. 19. Thus, the 3-bit output "111" of the priority encoder 159 is supplied to the selector 148 as the output of the comparator 145. Further, the enable signal E produced by the comparator 145 is supplied to the AND circuit 149.

Further, the priority encoder 159 produces a 3-bit selection signal C having a value "110" when there holds a relationship (A–Ey)<Ec(8/8) and (A–Ey)>Ec(7/8). In the case the relationship (A–Ey)<Ec(i/8) is met, on the other hand, all the comparator elements CPA–CPH produce an output "1," and the priority encoder 159 produces the output "000." Further, the priority encoder 159 produces the enable signal E with the value "0." In this case, the AND circuit 149 of FIG. 17 is disabled.

In response to the output selection signal O of the priority encoder 159, the selector 148 of FIG. 17 produces one of the 1/8 - - - 8/8-divided signals of the dividing circuit 147 selectively, such that the 8/8-divided signal is obtained when the signal O has a value "111," the 7/8-divided signal is obtained when the signal O has a value "110," the 6/8-divided signal is obtained when the signal O has a value "101," the 5/8-divided signal is obtained when the signal O has a value "100," the 4/8-divided signal is obtained when the signal O has a value "011," the 3/8-divided signal is obtained when the signal O has a value "010," the 2/8-divided signal is obtained when the signal O has a value "001," and the 1/8-divided signal is obtained when the signal O has a value "000."

Figure 20:
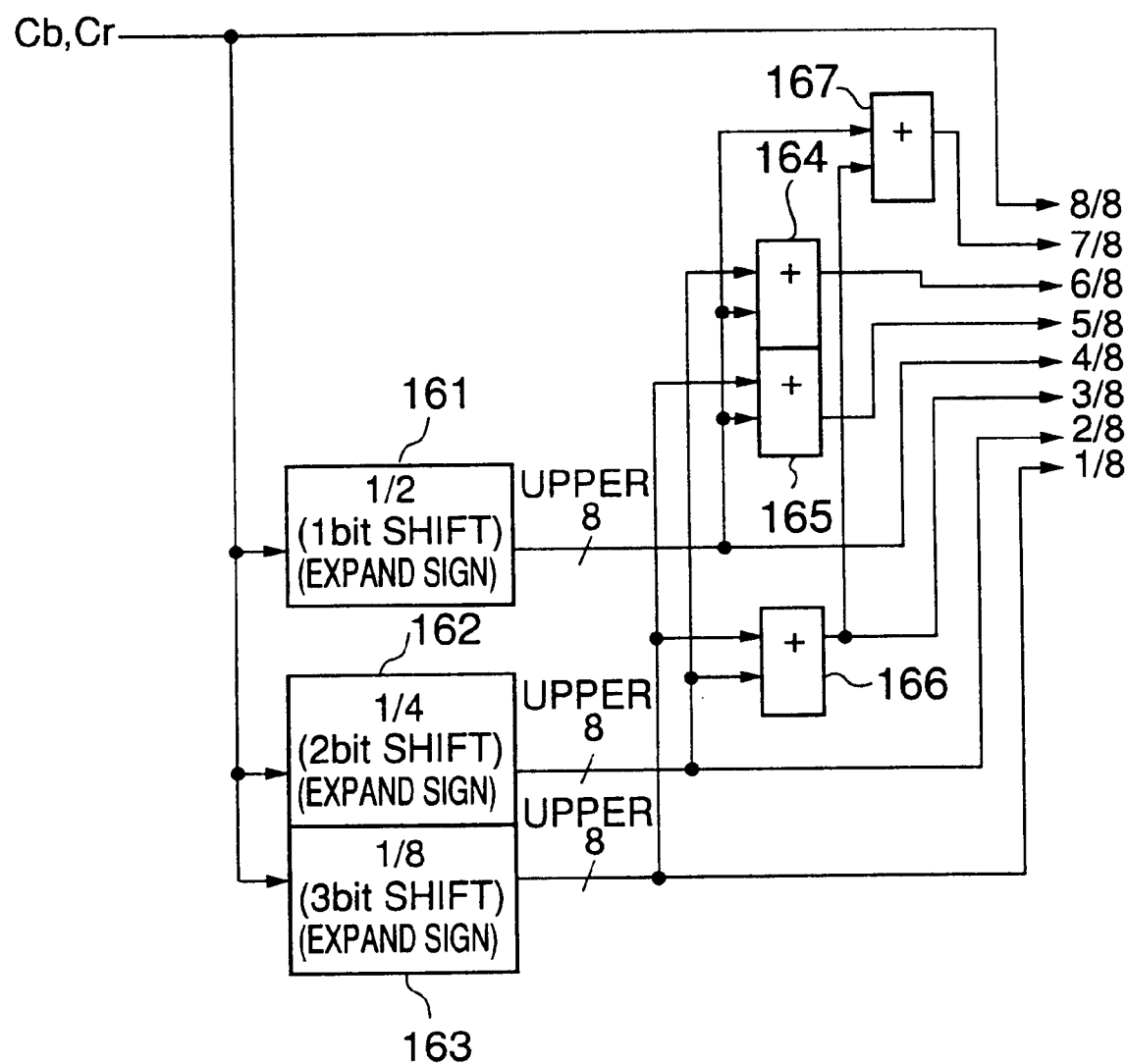
FIG. 20 is a diagram showing the construction of a processing unit conducting an operation.

FIG. 20 explains the construction of the dividing circuit 147 used in the circuit of FIG. 17 for dividing the color difference signal Cb or Cr.

Referring to FIG. 20, the dividing circuit 147 includes shift registers 161–163 and adders 164–167. Contrary to the dividing circuit of FIG. 18, the dividing circuit 147 of FIG. 20 produces the color difference signal Cb or Cr itself as the 8/8-divided signal. Further, the shift registers 161–163 respectively apply a one-bit shift, a two-bit shift and a three-bit shift to the incoming color difference signal Cb or Cr, wherein each of the shift registers 161–163 extracts the upper eight bits of the color difference signal Cb or Cr thus shifted as the output. Thereby, the shift register 163 produces a 1/8-divided output, the shift register 162 produces a 2/8-divided output, and the shift register 163 produces a 4/8-divided output.

By adding the outputs of the shift registers 161–163 by using the adders 164–167, the foregoing 1/8 - - - 8/8-divided outputs of the incoming color difference signal Cb or Cr is obtained.

Figure 21:
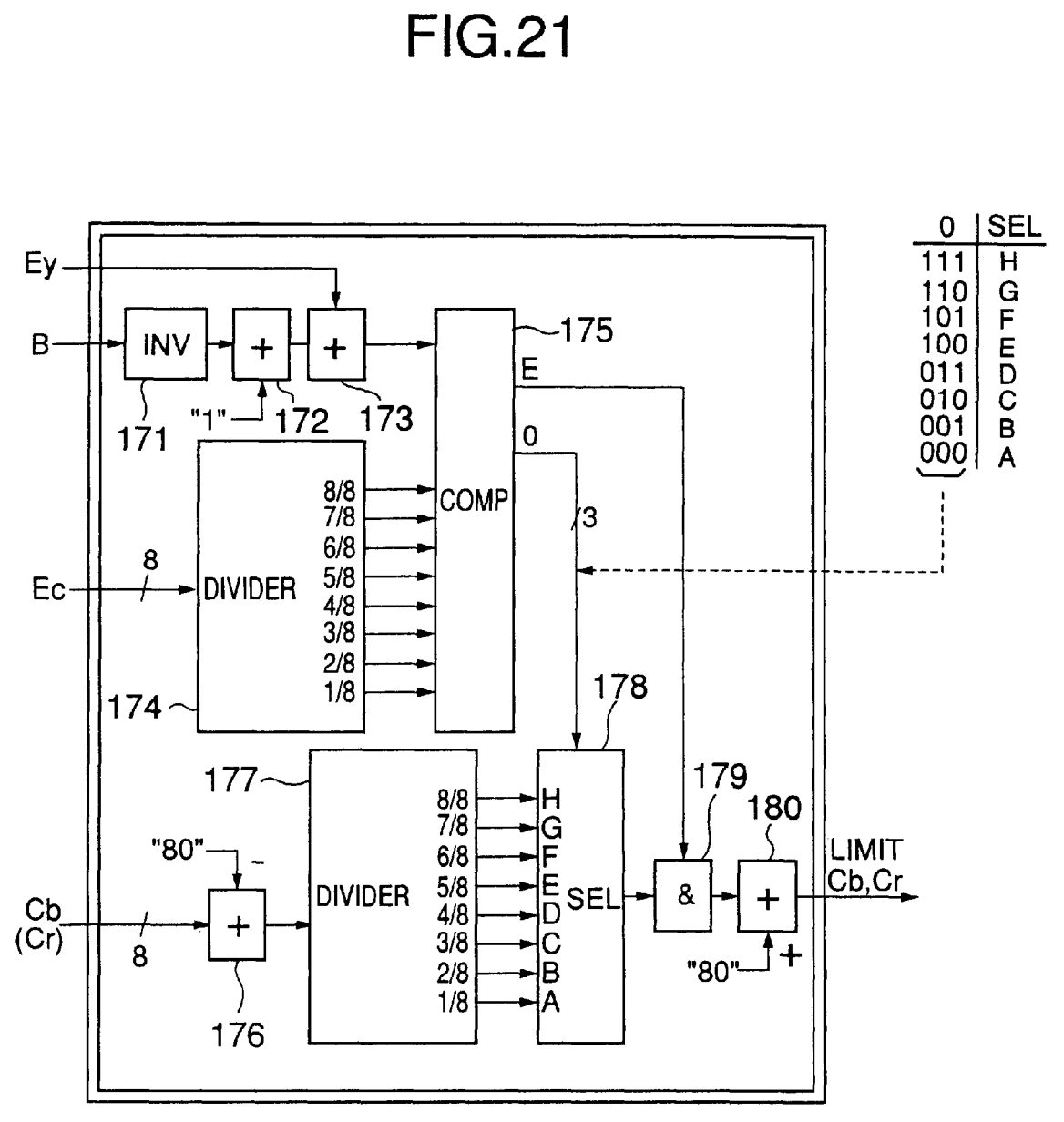

FIG. 21 shows the construction of the fifth and sixth operational unit 114 or 115 respectively carrying out the operation of Eq. (17) or (18) in the form represented by hardware.

Referring to FIG. 21, the operational unit 114 or 115 includes an inverter 171, adders 172, 173, 176 and 180, first and second dividers 174 and 177, a comparator (COMP) 175, a selector (SEL) 178 and an AND circuit (&) 179.

In the case of constructing the fifth operational unit 114 of Eq. (17), the lower limit value B and the signals Ey, Ec and Cb are supplied. In the case of constructing the sixth operational unit 115 of Eq. (18), on the other hand, the lower limit value B and the signals Ey, Ec and Cr are supplied. Thereby, the circuit of 19 divides the color signal amplitude ratio (–B+Ey)/Ec in eight steps (1/8–8/8) similarly to the case of FIG. 17.

In the construction of FIG. 21, it should be noted that lower limit value B is logically inverted by the inverter 171 and further converted to a complement number by adding a number "+1" thereto in the adder 172. The complement representation of the lower limit value B is then added with the signal Ey in the adder 173 to form the signal (–B+Ey), and the output of the adder 173 is supplied to the comparator 175. Further, the adder 176 and the dividers 174 and 177 respectively have the same construction as the adder 146 and the dividers 144 and 147 of FIG. 17 and carry out the same operation as in the case of FIG. 17. Thereby, each of the output signals of the divider 174 is supplied to the comparator 175. Further, the output signals of the divider 177 indicative of the 1/8–8/8-divided signals of the signal Cb, are supplied to the selector 178.

The selector 178 then carries out the selection operation similarly to the selector 148 of FIG. 17 and selects one of the signals supplied to the input terminals A–H of the selector 178 in response to the 3-bit output selection signal O produced by the comparator 175. For example, the signal coming into the input terminal F of the selector 178 is selected when the output selection signal O of the comparator 175 has the value "101." In this case, the 6/8-divided signal of the incoming color difference signal Cb or Cr is selectively supplied to the adder 180 via the AND circuit 179, and the 6/8-divided signal thus supplied to the adder 180 is added with the number "80" (=128) to form the limited color difference signal Cb' or Cr' in which the lower limit thereof is limited.

Figure 22:
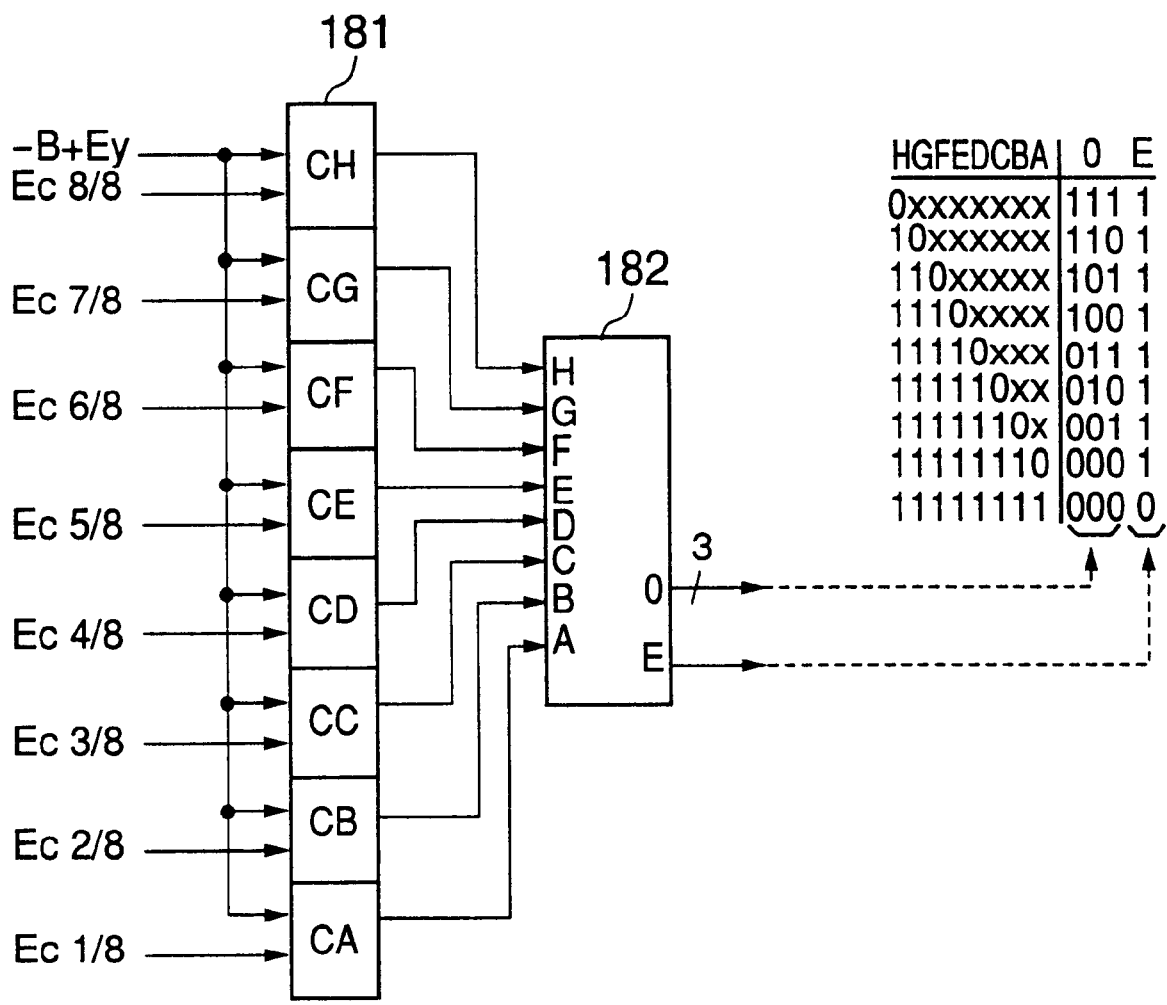
FIG. 22 is a diagram showing the construction of a comparator.

FIG. 22 shows the construction of the comparator 175 of FIG. 21.

Referring to FIG. 22, the comparator 175 includes a comparator array 181 and a priority encoder 182, wherein the comparator array 181 includes comparator units CA–CH. Each of the comparator elements CA–CH carries out the same comparison operation as in the case of the comparator elements CPA–CPH except that the reference signal used for the comparison is (−B+Ey). Further, the priority encoder 182 operates similarly to the priority encoder 159. Thus, further description of the circuit of FIG. 22 will be omitted.

Figure 23:
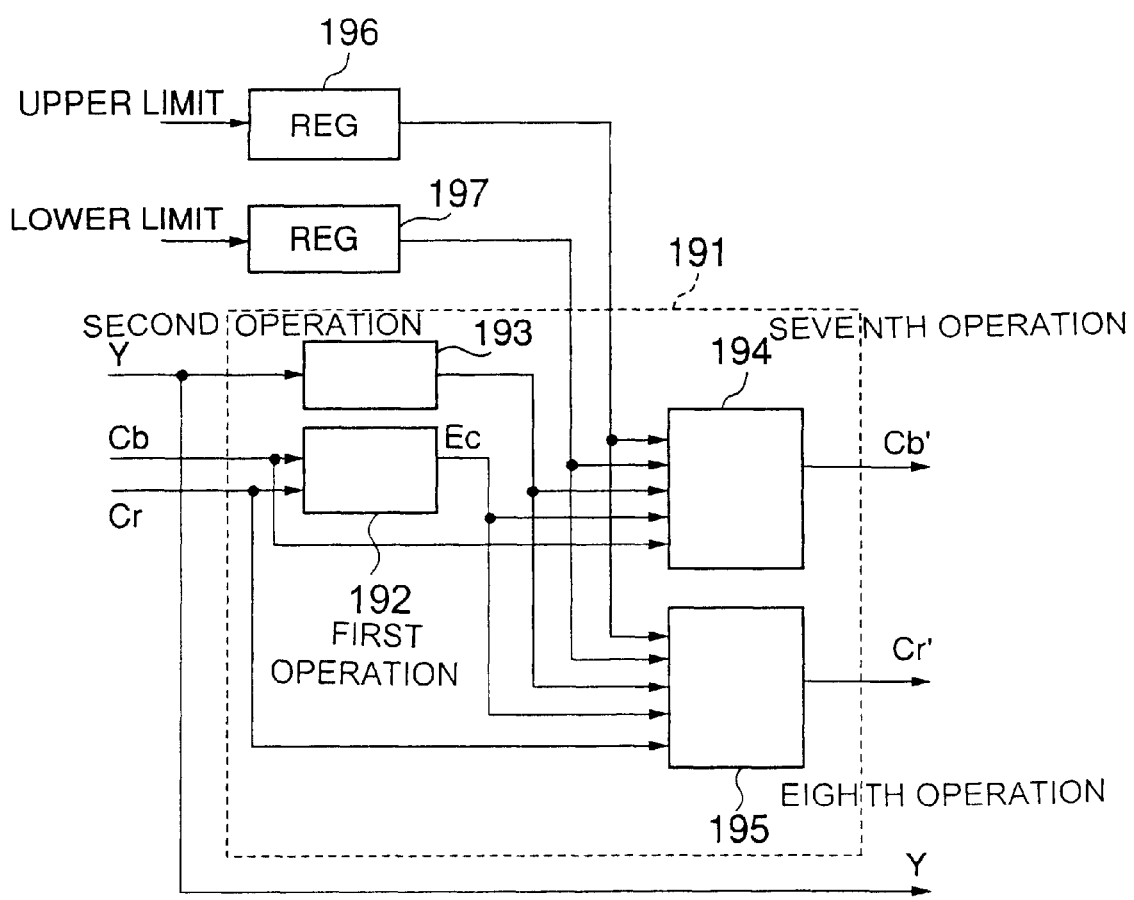
FIG. 23 is a diagram showing the construction of a video signal processing apparatus according to a tenth embodiment of the present invention.

FIG. 23 shows the construction of the upper/lower limiter used in a video signal processing apparatus according to a tenth embodiment of the present invention.

Referring to FIG. 23, the upper/lower limiter limits the upper and lower levels of the incoming video signal according to Eqs. (9), (10), (13), (14), (17) and (18) and includes an operational unit 191 implemented in the form of a DSP, and the like, and resisters 196 and 197, wherein the operational unit 191 includes a first operational unit 192 carrying out the operation of Eq. (9), a second operational unit 193 carrying out the operation of Eq. (10), a seventh operational unit 194 carrying out the operation of Eqs. (13) and (17), and an eighth operational unit 195 carrying out the operation of Eqs. (14) and (18).

Further, the first register 195 and the second register 196 of FIG. 23 hold the upper limit value A (IRE) and the lower limit value B (IRE) respectively, and the first and second operational units 192 and 193 have a construction similar to the construction of the first and second operational units 102, 103, 112 and 113. Thereby, the first and second operational units 192 and 193 performs the operation similar to the operation of the operational units 102, 103, 112 and 113.

It should be noted that the seventh operational unit 194 produces the limited color difference signal Cb' according to Eq. (13) by using the upper limit value A in the register 196 and the signals Ey, Ec and Cb. Further, the operational unit 194 produces the limited color difference signal Cb' according to Eq. (17) by using the upper limit value A in the register 197 and the signals Ey, Ec and Cb.

Further, the eighth operational unit 195 produces the limited color difference signal Cr' according to Eq. (14) by using the upper limit value A in the register 196 and the signals Ey, Ec and Cr. Further, the operational unit 195 produces the limited color difference signal Cr' according to Eq. (17) by using the upper limit value A in the register 197 and the signals Ey, Ec and Cb.

Figure 24:
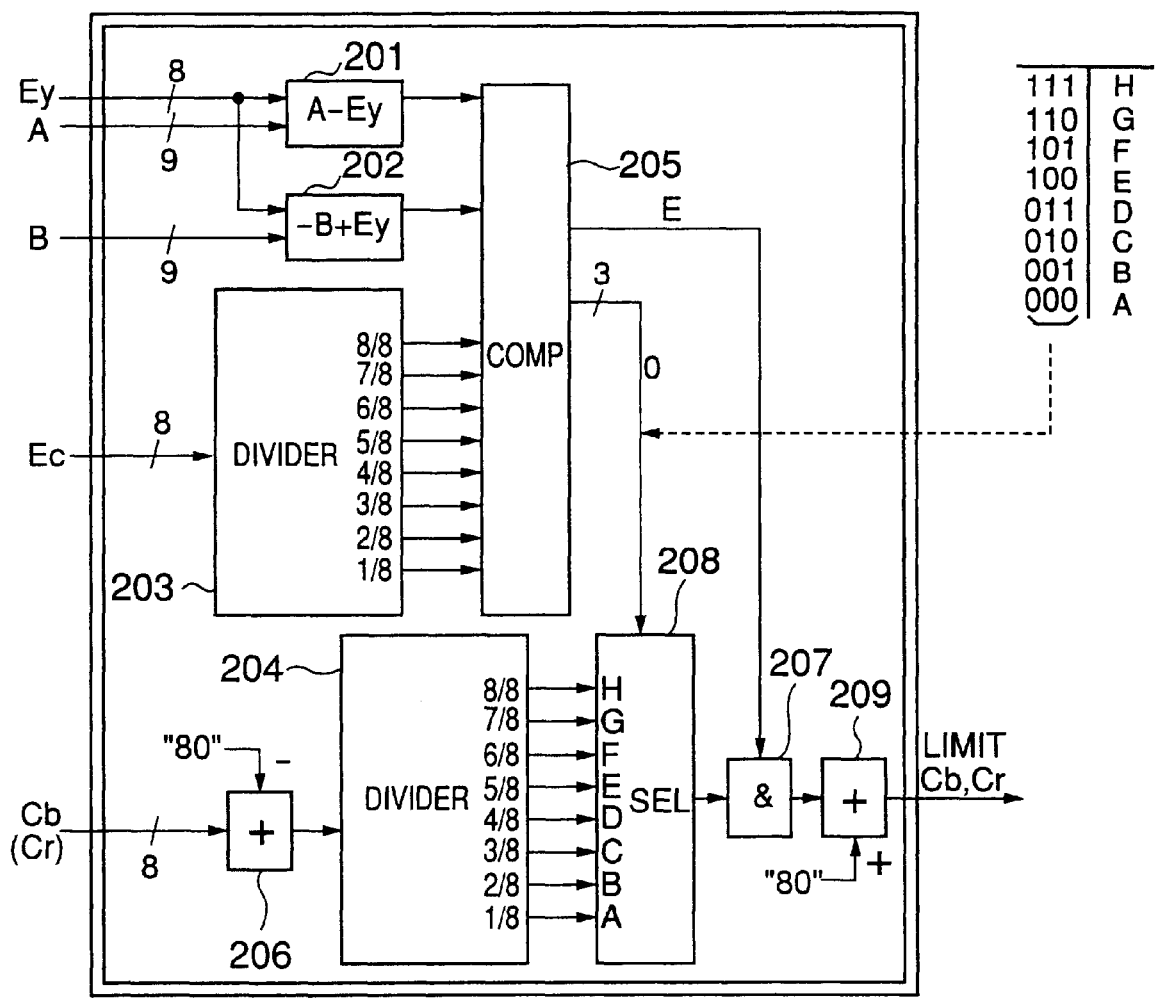
FIG. 24 is a diagram showing the construction of a processing unit.

FIG. 24 shows the construction of the operational unit 191 as implemented in the form of hardware.

Referring to FIG. 24, the operational unit 191 includes an operational unit 201 for producing the signal (A−Ey), an operational unit 202 for producing the signal (−B+Ey), first and second dividers 203 and 204, a comparator (COMP) 205, adders 206 and 209, an AND circuit 207 and a selector (SEL) 208.

The operational unit 201 has a construction similar to that of FIG. 17 that includes the inverter 141 and adders 142 and 143, while the operational unit 202 has a construction similar to that of FIG. 21 that includes the inverter 171 and adders 172 and 173. Further, the dividers 203 and 204 correspond to the dividers 144 and 147 of FIG. 17 or the dividers 174 and 177 respectively and perform the same operation. Thus, further description thereof will be omitted. In the case of carrying out the operation of Eq. (13) or Eq. (17), the color difference signal Cb is supplied to the operational unit 191. When the operation of Eq. (14) or (18) is to be conducted, the color difference signal Cr is supplied.

The comparator 205 compares the output signals (A−Ey) and (−B+Ey) from the operational units 201 and 202 with the 1/8 - - - 8/8-divided signals of the first divider 203 and produces a 3-bit selection signal O and an enable signal E, wherein the selection signal O is supplied to the selector 208 for controlling the same such that the output of the second divider 204 is selectively supplied. As indicated in the table of FIG. 24, the selector 208 selects the signal supplied to one of the input terminals A–H in response to the 3-bit selection signal O similarly to the selector 148 or 178 of FIG. 17 or FIG. 21.

Further, it should be noted that the adder 206 is supplied with the color difference signal Cb or Cr and subtract the number "80" (=128) from the color difference signal thus supplied. The color difference signal Cb or Cr thus processed by the adder 206 is further divided into eight-step signals (1/8 - - - 8/8-divided signals) by the divider 204, and one of the divided signals is selected by the selector 208 under control of the selection signal O from the comparator 205. The output of the divider 204 thus selected is then added with the number "80" (=128) in the adder 209 and the amplitude limited color difference signal Cb' or Cr' is obtained as an output of the adder 209.

Figure 25:
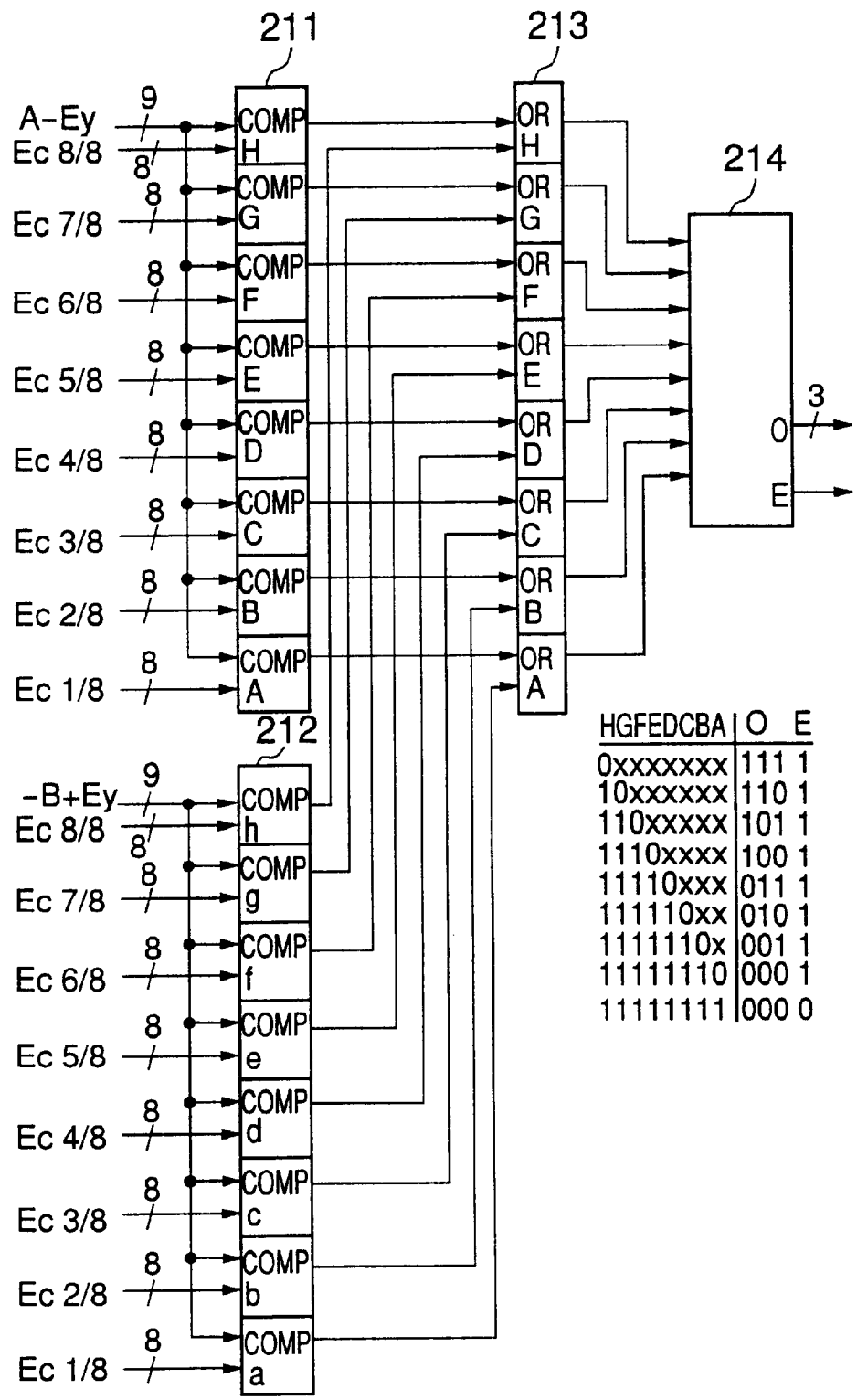
FIG. 25 is a diagram showing the construction of a comparator.

FIG. 25 shows the construction of the comparator 205 in detail.

Referring to FIG. 25, the comparator 205 includes comparator arrays 211 and 212, an OR circuit array 213 and a priority encoder 214, wherein the comparator array 211 includes comparators COMPA–COMPH while the comparator array 212 includes comparators COMPa–COMPh. Further, the OR circuit array 213 includes OR circuits ORA–ORH.

It should be noted that each of the comparators COMPA–COMPH produces an output "0" when there holds a condition (A−Ey)>Ec (i/8) (i=1–8) and an output "1" when the foregoing condition is not met. Further, each of the comparators COMPa–COMPh produces an output "0" when there holds a condition (−B+Ey)<Ec (i/8) (i=1–8) and an output "1" when the foregoing condition is not met.

Further, the priority encoder 214 has a construction identical to the construction of the priority encoder 159 of FIG. 19 or the priority encoder 182 of FIG. 22 and produces the 3-bit selection signal O and the enable signal according to the table in FIG. 25.

Further, it should be noted that the present invention is by no means limited to the embodiments described heretofore, but various variations and modifications may be made without departing from the scope of the invention.

What is claimed is:

1. A video signal processing apparatus, comprising:
   a receiver receiving an incoming video signal, said receiver further producing an output video signal in response thereto;
   a limit setup unit setting up at least one of an upper limit value and a lower limit value for said output video signal; and
   a limiter supplied with said output video signal from said receiver and further with at least one of said upper limit value and said lower limit value from said limit setup unit, said limiter limiting a level of said output video signal produced by said receiver, by comparing said level of said output video signal according to any of said upper limit value and lower limit value;
   wherein said video signal processing apparatus is supplied with said video signal in the form of a first analog component signal and a second analog component signal, and wherein said limit setup unit includes an upper limit setup unit setting up said upper limit value, said limiter including:
      a voltage divider supplied with said second analog component signal and dividing said second analog component signal to form a voltage-divided second analog component signal;

a comparator supplied with a sum of said first analog component signal and one of said second analog component signal and said voltage-divided second analog component signal as an input signal, said comparator being further supplied with said upper limit value from said upper limit setup unit and comparing said input signal with said upper limit value; and a selector supplied with an output of said comparator, said selector being further supplied with said second analog component signal and said voltage-divided second analog component signal and selectively outputting said voltage-divided second analog component signal when said sum exceeds said upper limit value.

2. A video signal processing apparatus, comprising:

a receiver receiving an incoming video signal, said receiver further producing an output video signal in response thereto;

a limit setup unit setting up at least one of an upper limit value and a lower limit value for said output video signal; and a limiter supplied with said output video signal from said receiver and further with at least one of said upper limit value and said lower limit value from said limit setup unit, said limiter limiting a level of said output video signal produced by said receiver, by comparing said level of said output video signal according to any of said upper limit value and lower limit value;

wherein said video signal processing apparatus is supplied with said video signal in the form of a first analog component signal and a second analog component signal, and wherein said limit setup unit includes a lower limit setup unit setting up said lower limit value, said limiter including:

a voltage divider supplied with said second analog component signal and dividing said second analog component signal to form a voltage-divided second analog component signal;

a comparator supplied with a sum of said first analog component signal and one of said second analog component signal and said voltage-divided second analog component signal as an input signal, said comparator being further supplied with said lower limit value from said lower limit setup unit and comparing said input signal with said lower limit value; and a selector supplied with an output of said comparator, said selector being further supplied with said second analog component signal and said voltage-divided second analog component signal and selectively outputting said voltage-divided second analog component signal when said sum exceeds said lower limit value in a negative voltage direction.

* * * * *